US012776925B2

(12) United States Patent
Wakabayashi

(10) Patent No.: US 12,776,925 B2
(45) Date of Patent: Oct. 27, 2026

(54) COMMUNICATION NETWORK NODE, METHOD, AND MOBILE TERMINAL

(71) Applicant: Sony Group Corporation, Tokyo (JP)

(72) Inventor: Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 969 days.

(21) Appl. No.: 17/423,126

(22) PCT Filed: Jan. 22, 2020

(86) PCT No.: PCT/EP2020/051501
§ 371 (c)(1),
(2) Date: Jul. 15, 2021

(87) PCT Pub. No.: WO2020/152213
PCT Pub. Date: Jul. 30, 2020

(65) Prior Publication Data
US 2022/0278857 A1 Sep. 1, 2022

(30) Foreign Application Priority Data
Jan. 22, 2019 (EP) .................................... 19153092

(51) Int. Cl.
*H04L 9/00* (2022.01)
*G06Q 20/14* (2012.01)
*G06Q 20/32* (2012.01)

(52) U.S. Cl.
CPC ............. *H04L 9/50* (2022.05); *G06Q 20/145* (2013.01); *G06Q 20/32* (2013.01)

(58) Field of Classification Search
CPC ......... H04L 9/50; G06Q 20/145; G06Q 20/32
See application file for complete search history.

(56) References Cited

U.S. PATENT DOCUMENTS

| | | | | | |
|---|---|---|---|---|---|
| 2002/0178034 | A1* | 11/2002 | Gardner | G06Q 10/02 | 705/5 |
| 2004/0049450 | A1* | 3/2004 | Lussler | G06Q 30/02 | 705/38 |
| 2010/0250727 | A1* | 9/2010 | King | G01S 5/0027 | 709/224 |
| 2017/0005804 | A1* | 1/2017 | Zinder | H04L 9/3239 | |

(Continued)

FOREIGN PATENT DOCUMENTS

| | | | |
|---|---|---|---|
| CN | 104392505 | A | 3/2015 |
| CN | 104835209 | A | 8/2015 |

(Continued)

OTHER PUBLICATIONS

International Search Report and Written Opinion mailed on Mar. 26, 2020, received for PCT Application PCT/EP2020/051501, Filed on Jan. 22, 2020, 6 pages including English Translation.

(Continued)

*Primary Examiner* — Patrick Mcatee
*Assistant Examiner* — Zesheng Xiao
(74) *Attorney, Agent, or Firm* — XSENSUS LLP

(57) ABSTRACT

The present disclosure provides a communication network node for providing data to a distributed ledger, wherein the node has circuitry configured to provide a special condition for a smart contract, and verify whether the special condition is met.

7 Claims, 12 Drawing Sheets

(56) References Cited

U.S. PATENT DOCUMENTS

| | | | | |
|---|---|---|---|---|
| 2017/0171754 | A1 | 6/2017 | South | |
| 2017/0261590 | A1 | 9/2017 | Tseng | |
| 2018/0338001 | A1* | 11/2018 | Pereira Cabral | H04L 67/141 |
| 2020/0162473 | A1* | 5/2020 | Mercuri | G06Q 20/065 |
| 2020/0302424 | A1* | 9/2020 | Centner | G06Q 20/0855 |
| 2021/0264553 | A1* | 8/2021 | Gajnutdinov | G06Q 10/08 |

FOREIGN PATENT DOCUMENTS

| | | | |
|---|---|---|---|
| CN | 108965964 | A | 12/2018 |
| CN | 109118214 | A | 1/2019 |
| WO | WO-2018039374 | A1 | 3/2018 |
| WO | 2018/217788 | A1 | 11/2018 |

OTHER PUBLICATIONS

Christidis et al., "Blockchains and Smart Contracts for the Internet of Things", IEEE Access, Special Section on the Plethora of Research in Internet of Things (IoT), vol. 4, Jun. 3, 2016, pp. 2292-2303.

Karinsalo Anni, "Smart Contracts for aMobility-as-a-Service Ecosystem", 2018 IEEE International Conference on Software Quality, Reliability and SecurityCompanion , Aug. 13, 2018 , pp. 135-138.

"Fintech Challenge 2018", Mitsubishi UFJ Financial Group, Grand-prix Bonus Plat Form for Innovation!, [Online], Mitsubishi UFJ Financial Group, Mar. 15, 2018.

* cited by examiner

Time/Date
- Weekday
  - Morning before 6 AM
  - Daytime between 10 AM and 4 PM
  - Evening after 8 PM
- Whole day on Saturday and Sunday Zone/direction
- Zone A - Zone C
- Morning west bound
- Evening east bound

COMMUNICATION NETWORK NODE, METHOD, AND MOBILE TERMINAL

CROSS-REFERENCE TO RELATED APPLICATIONS

The present application is based on PCT filing PCT/EP2020/051501, filed Jan. 22, 2020, which claims priority to EP 19153092.2, filed Jan. 22, 2019, the entire contents of each are incorporated herein by reference.

TECHNICAL FIELD

The present disclosure generally pertains to a communication network node, a method for operating a smart contract, a method for controlling a communication network, and a mobile terminal.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owning, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service and associated communication, it is generally desirable to provide a communication network node, a method for operating a smart contract, and a method for controlling a communication network for providing a distributed ledger.

SUMMARY

According to a first aspect, the disclosure provides a communication network node for providing data to a distributed ledger, wherein the node comprises circuitry configured to provide a special condition for a smart contract, and verify whether the special condition is met.

According to a second aspect, the disclosure provides a communication network node for providing data to a distributed ledger, wherein the node comprises circuitry configured to recognize a service disturbance, the service being defined on the basis of a smart contract, and adapt the smart contract on the basis of the recognized service disturbance.

According to a third aspect, the disclosure provides a method for controlling a communication network comprising multiple nodes for providing a distributed ledger, the method comprising providing a special condition for a smart contract, and verifying whether the special condition is met.

According to a fourth aspect, the disclosure provides A method for controlling a communication network comprising multiple nodes for providing a distributed ledger, the method comprising recognizing a service disturbance, the service being defined on the basis of a smart contract, and adapting the smart contract on the basis of the recognized service disturbance.

According to a fifth aspect, the disclosure provides a mobile terminal for communicating with a network node for providing data to a distributed ledger, wherein the mobile terminal comprises circuitry configured to provide data to the network node for verifying whether a special condition of a smart contract is met.

According to a sixth aspect, the disclosure provides a mobile terminal for communicating with a network node for providing data to a distributed ledger, wherein the mobile terminal comprises circuitry configured to recognize a service disturbance, the service being defined on the basis of a smart contract.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
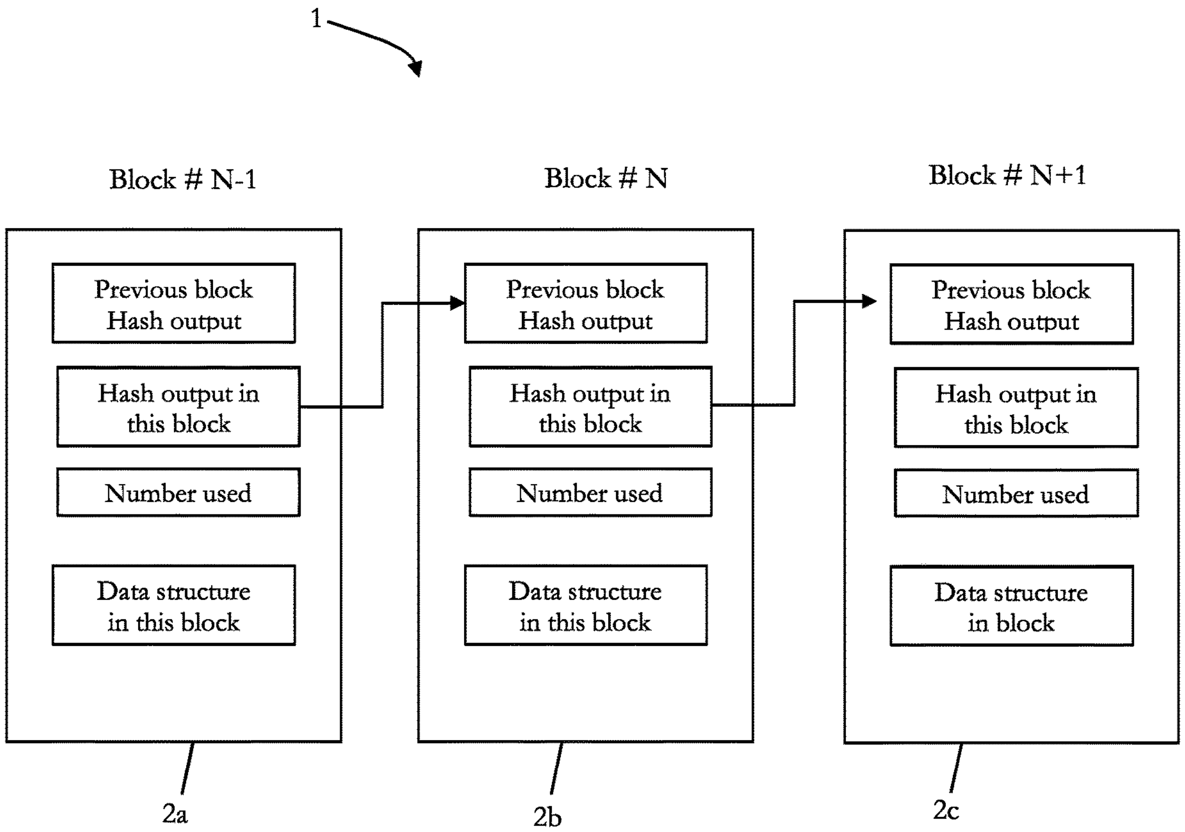
FIG. 1 schematically illustrates a blockchain.

Before a detailed description of the embodiments under reference of FIG. 1 is given, general explanations are made.

As mentioned in the outset, generally, distributed ledgers and mobility as a service (MaaS) are known.

The present disclosure pertains generally in some embodiments or aspects to the application of blockchains/distributed ledger for mobility as a service (MaaS) application, in particular MaaS among more than one service provider (multi-modal transports).

The present disclosure also generally pertains in some embodiments or aspects to the application of a distributed ledger or blockchain as one example for a distributed ledger, without limiting the present disclosure to blockchains. Distributed ledgers or blockchains are recognized to be suitable for Mobility as a service (MaaS) applications according to some aspects of the present disclosure, since a distributed ledger requires a distributed database for journey history (or journey data) among multi-players, i.e. multiple mobility as a service providers.

The technology of a distributed ledger and of a special example of it, namely of a blockchain, will also be discussed further below. More generally, the term distributed ledger is used as a type of database, which shares digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also be referred to as "consortium", as will also be explained further below. It is also possible to differentiate the access permission to data on a ledger from each of the layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

In some embodiments, MaaS blockchains may require to handle a large number of passengers, store various types of journey records, large size of block, peak of processing at rush hour and so on.

In some embodiments, generally the distributed ledger or blockchain is suitable for MaaS application, since it provides a distributed database for a journey history among multiple players, without limiting the present disclosure in that regard.

Moreover, in some embodiments smart contracts are used, e.g. for MaaS. For example, ticket or MaaS services are provided based on the agreements between passengers and service providers/operators. Thus, in some embodiments normal cases (e.g. buying a ticket) or exceptional cases/procedures other than a normal case (e.g. just buying the ticket) may be addressed with smart contracts. The smart contracts may handle these exceptional procedures in addition to normal procedures.

In some embodiments, smart contracts are computer language-based contracts in the blockchains. Smart contacts may be automatically executed if predefined conditions are met, such as a predefined input from one or more sensors, a user interface input from human, an application interface (API) call from other servers, etc. as will also be discussed in more detail further below.

Some embodiments pertain to how to use the smart contracts for practical MaaS use cases and, for example, conditions in smart contract may be pre-defined depending on the type of service agreements between a passenger and MaaS provider (e.g., MaaS monthly subscription). Conventional smart contracts are typically immutable when they are owned by a blockchain.

However, it has been recognized that this characteristic, although suitable for contracts, is not flexible, and, thus, some embodiments address a dilemma between flexibility and stability (conventionally, it may be difficult to change the conditions of a smart contract, since, as mentioned, it is immutable).

Moreover, it has been recognized that in some exceptional circumstances like transport disruption, using alternative routes or the like, flexible conditions may be required, in particular, as it may be difficult to predict various exceptional cases in advance and, thus, e.g. for MaaS use cases, it may be also useful to update/change the conditions after issue of a contract.

In the following, a brief outline of the following description is given. In a first part, some basic embodiments of a MaaS blockchain system is discussed. A second part pertains to embodiments of smart contracts. A third part pertains to embodiments of operation of smart contracts with pre-defined off-peak conditions, wherein the definition of off-peak is pre-defined in smart contracts. A fourth part pertains to embodiments of operation of the smart contracts, wherein a change of conditions during a trip may be needed (e.g. in the case of a diverted route or unplanned alternative transport due to disruption of transport).

First Part

In the following, a blockchain and its general data structure will be explained under reference of FIG. 1. In this embodiment of a blockchain, features are a network/topology, a consensus algorithm a Hash function, participant authentication, a scalability/block structures and performance.

FIG. 1 illustrates a general structure of a blockchain 1. The blockchain 1 includes a chain of multiple data blocks 2*a*, 2*b* and 2*c*, wherein the block 2*b* is a current block (Block #N), the block 2*a* is a previous block (Block #N−1) and the block 2*c* is a future or successor block (Block #N+1). Each block includes a hash function result of a previous block, a main data structure, an input value for hash function and hash function result of the current block, wherein the hash function result of current block (2*b*) is always used as input to the next block (2*c*).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 2*a*, 2*b* and 2*c*. The blockchain 1 is an example of a distributed ledger, which may be used, for example, for providing MaaS in some embodiments.

Figure 2:
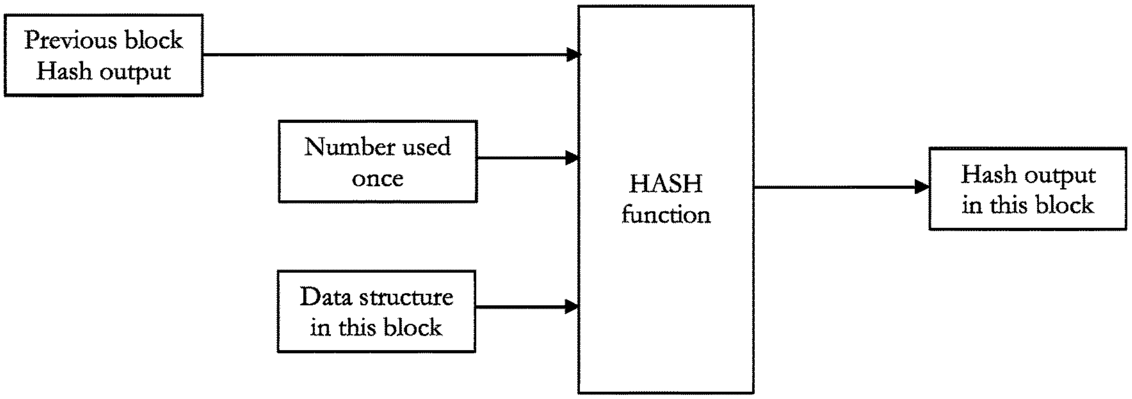
FIG. 2 schematically illustrates hashing in a blockchain.

FIG. 2 illustrates the input and output of a hash function, which is used, for example, for the blockchain 1 of FIG. 1.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The input for the hash function are a previous hash output, the number used once and the main body of data in the current block (e.g. block 2*b* in FIG. 1). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BPT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 3:
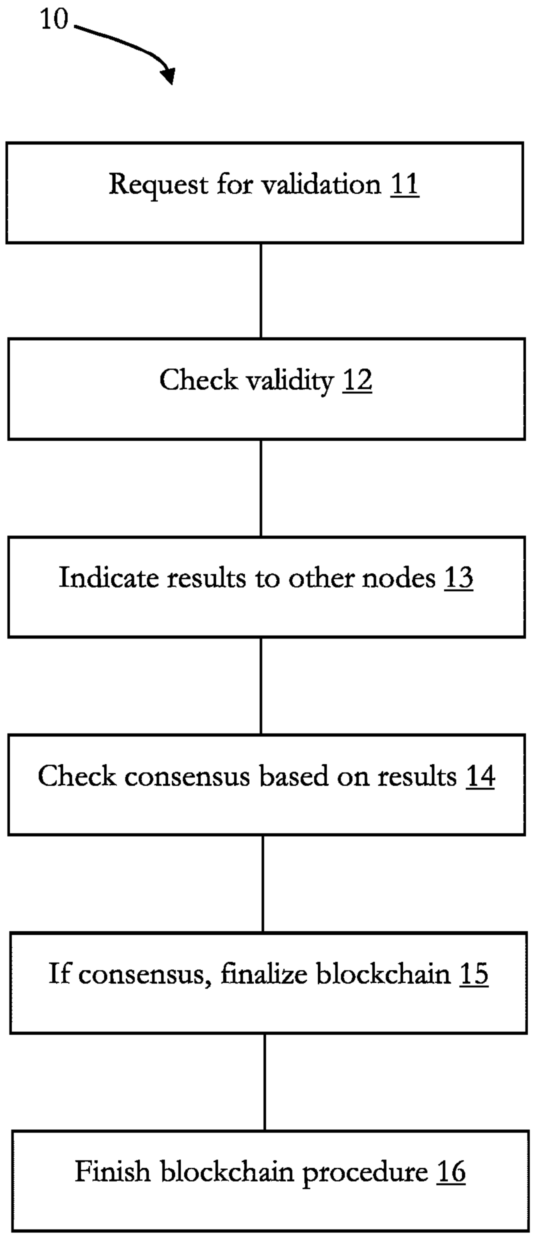
FIG. 3 is a flowchart illustrating an embodiment of a consensus protocol.

FIG. 3 exemplary illustrates the process 10 of PBFT.

A leader node (it also called non-validating peer) requests at 11 other nodes to validate the blockchain. At 12, each requested node (validate peer) checks the validity of the blockchain with a hash function and indicates its result to other nodes at 13. At 14, a node receives the validity results from multiple other peers and checks the consensus of the blockchain, if it receives more valid results than a predefined criteria. If there is a consensus, at 15, the node writes/finalizes the blockchain. A leader peer checks the overall progress of the validity check in other nodes and finishes at 16 the blockchain procedure.

For resilience, the total number of nodes is more than 3f+1 in some embodiments, wherein f is the number of allowed failure nodes. For example, f=1, there is a total 4 nodes; if f=3, there is a total of 10 nodes, etc.

In some embodiments, the PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 4:
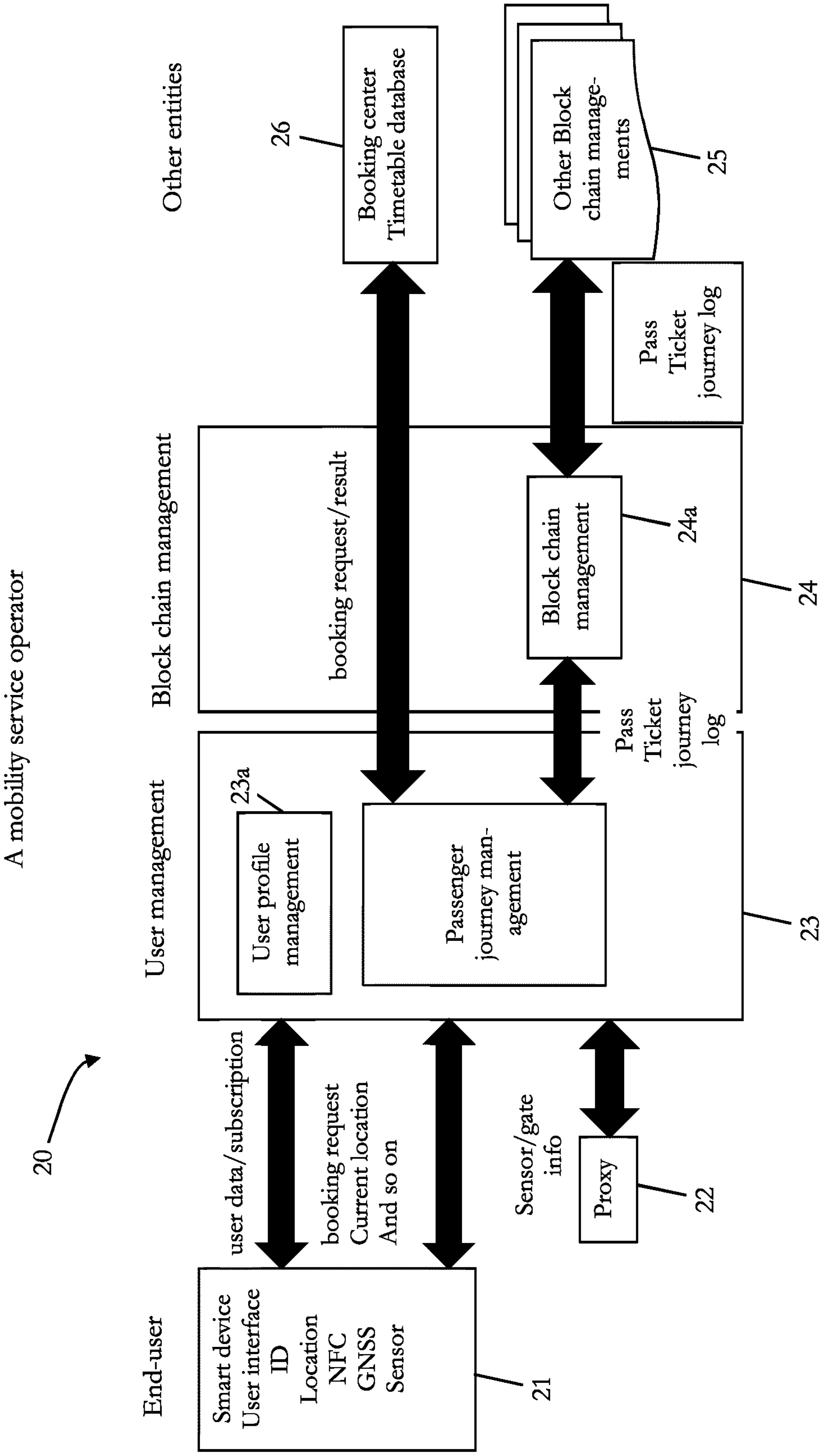
FIG. 4 illustrates a data flow in a MaaS system.

In the following, the data flow of a MaaS system 20 is explained under reference of FIG. 4, illustrating the overall data flow. In the MaaS system 20 it is exemplary assumed that the end-user has an own terminal 21, e.g. a smart phone (or any other type of electronic (mobile) device). Some users (e.g. visitor from oversea) may not have a smartphone or the like, and in such cases, for example, an alternative solution may be provided, which is based on a proxy function (proxy 22) in FIG. 4, which provides a gate to the user.

FIG. 4 illustrates the data flow diagram of the MaaS system 20, wherein three main sections are provided, an end-user section on the left side, a mobility service operator/provider section in the middle and another entities section on the right side, wherein the end-user section and the other entities section communication with the mobility service provide section in the middle.

For this embodiment of the MaaS system 20 it is assumed that the mobility service provider has a user management function 23 with a web server or cloud for customer services and a user profile management function 23*a* and a passenger journey management function 23*b*. It further has a blockchain management function 24. The blockchain function 24 having the block chain management function 24*a* communicates with blockchain management functions 25 of other entities section. If a seat reservation/shared ride booking is provided by a booking center 26, a central booking server/cloud is provided.

The end user communicates with its own terminal, i.e. smart phone 21 in this embodiment, which has exemplary a user interface and sensors, e.g. GNSS, NFC, etc.

As can also be taken from FIG. 4, the end user can perform, for example, the following actions with the terminal or via the proxy 22: Subscription of services/purchase of one day/one week ticket; booking of train, reservation of car/ride share; transport embark/alight permission/record; post processing after alight (e.g. customer survey, refund or compensation of delay), etc.

The user profile management function 23*a* is configured to store static data, e.g. name, age, contact address, payment method (e.g. credit card), service subscription status, the preference of transport, any other unique ID, e.g. IMEI (International Mobile Station Equipment Identity), etc. and communicates with the terminal 21.

The passenger journey management function 23*b* is configured to perform several actions and to communicate with the terminal 21. For instance, with respect to a multimodal transport pass it manages, for example, a subscription of MaaS monthly service and a purchase of one-day ticket, one-week ticket, etc. With respect to a journey planning (or journey planner), it provides destination input, route selection/transport options, booking/travel arrangement and issues the ticket and issues the ticket ID, generates itinerary for the passenger and issues the itinerary ID etc. On the journey of a passenger/user, the passenger journey management function is configured to start the journey and, for each section of the journey (iteration), to check the pass/ticket hold and record the embankment, record the alight and add the journey log to the blockchain, and at the end of journey to terminate it and to close the itinerary.

The blockchain management function 24*a* communicates with the passenger journey management function 23*b* and the other block managements 25. It is configured to add, to validate/execute consensus protocol and to read the blockchains. Moreover, as can also be taken from FIG. 4, the pass, ticket and journey log information is communicated at least between the passenger journey management function 23*b* and the block chain management function 24*a* and between the block chain management function 24*a* and the other blockchain managements 25.

In the following, an embodiment of a blockchain 30 including a passenger journey history is explained under reference of FIG. 5.

Figure 5:
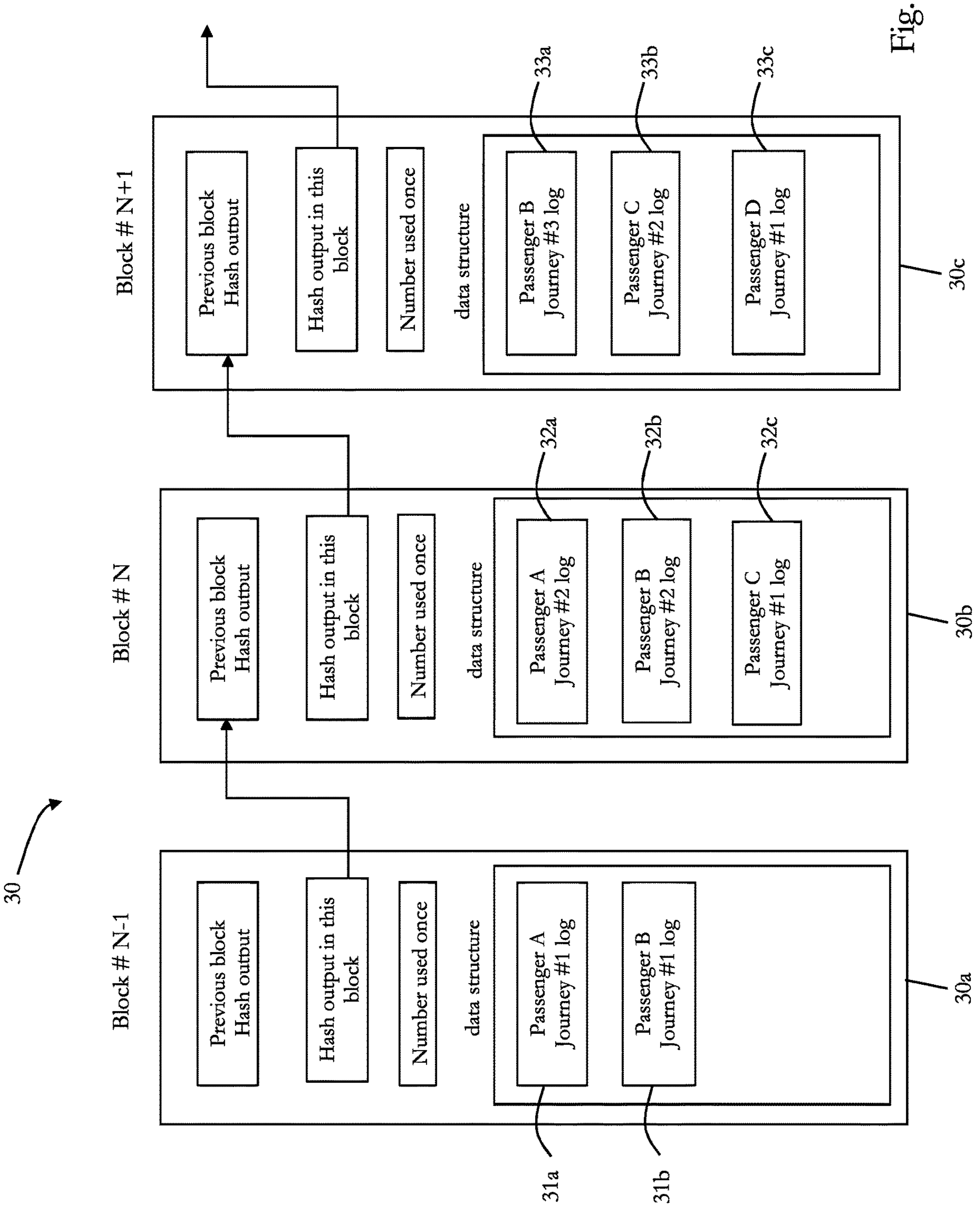
FIG. 5 illustrates an embodiment of a blockchain including journey log data.

The blockchain 30, as also generally explained under reference of FIG. 1, has several blocks 30*a*, 30*b*, 30*c*, wherein in FIG. 5 a past block 30*a* (Block #N−1), a current block 30*b* (Block #N) and a successor or next/future block 30*c* (Block #N+1) are exemplary illustrated.

Each of the blocks 30*a*, 30*b* and 30*c* can include one or more passenger logs in a transaction within a maximum given block size and within an associated data structure. In FIG. 5, the block 30*a* on the left hand side (Block #N−1) handles two passenger logs 31*a* and 31*b*. The hash output from the N−1 block 30*a* is provided to the next N block 30*b* (current block). The block 30*b* (Block #N) handles the next journey logs 32*a* and 32*b* of passengers A and B, and, additionally, a journey log 32*c* of a passenger's C journey. If, for example, a passenger D issues a new journey log, but if simultaneously the block size limit is exceed, the further journey log will be handled in the next block, i.e. in block 30*c* in the present example, which includes a further journey log 33*a* entry for passenger B, a further journey log entry 3*cb* of passenger C and a further journey log 33*c* entry for passenger D, such that the block 30*c* (Block N+1) handles the next journeys of passenger C and D and the remaining log of passenger D. Then, the hash output (N+1) is provided to the next block (N+2) (not shown in FIG. 5).

Generally, a journey log in the blockchain 30 may include at least one of the following information:

- Issuers: multimodal transport pass issuer, mobility service provider/transport operator, passenger id (anonymized data).
- Ticket info: Type of ticket, Type of transport (railway, rideshare and so on), Seat reservation (train/seat number), Price or ticket, Terms and conditions.
- Boarding record: The location of embankment, time/day of it, the location of alight, time/day of it, Unused/used.
- Remarks: Special notes (e.g. cancelled, delayed).

In some embodiments, the blockchain for MaaS is assumed to use permissioned blockchains. In permissioned blockchains, only permitted operators (forming a consortium) can add/read block and limited participants are allowed to join the validation of transaction (i.e. consensus with trusted players). Hence, in some embodiments, for example, the mobility service providers are organized in a consortium and only those having the according permission are allowed to access the permissioned distributed ledger or blockchain, while malicious participants or dishonest ones cannot join the consortium of blockchain.

In the following, an embodiment of a communication network 40 for providing a (permissioned) blockchain for MaaS is explained under reference of FIG. 6.

In terms of resilience, the communication network 40 mitigates the risk of single point of failure (SPOF), which is typically the weak point of systems, e.g. for conventional systems which are heavily relying on the central of server could be SPOF in the system.

Figure 6:
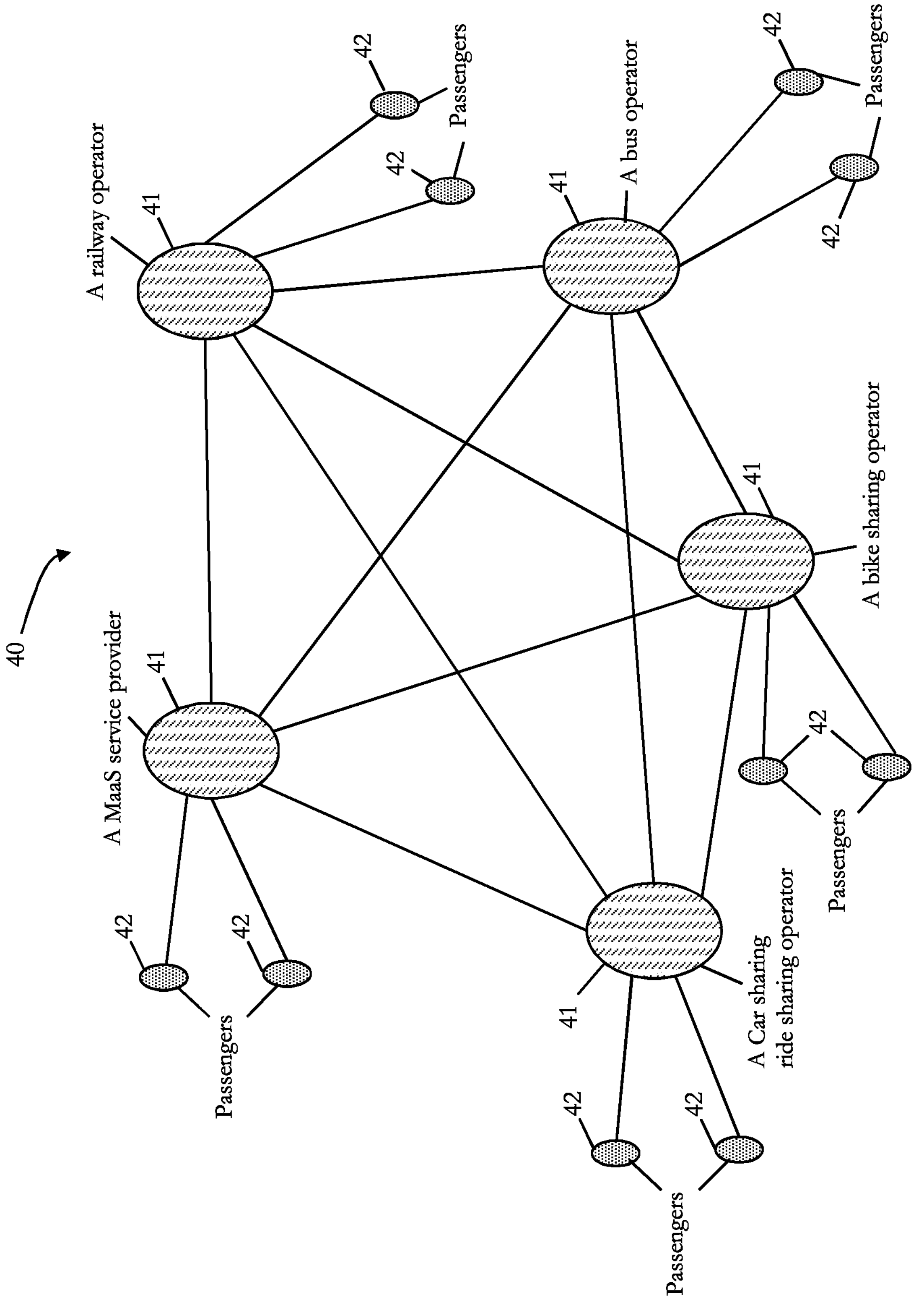
FIG. 6 illustrates an embodiment of a communication network for providing a blockchain.

As can be taken from FIG. 6, the communication network 40 has multiple nodes (or entities) 41 (large circles), which are associated with different operators or mobility service providers, such as a MaaS service provider, railway operator, a car sharing/ride sharing operator, a bike sharing operation and a bus operator.

Moreover, there are multiple passengers 42 (small circles) which can communicate with the nodes 41 of the mobility service providers. The mobility service provider nodes 41 may form together a communication network 40, which provides the permissioned blockchain for MaaS (e.g. blockchain 30 of FIG. 5).

A passenger 42 subscribes, for example, the monthly MaaS service provided by mobility service provider or buy one-day/one-week pass for multi-modal transport services by communicating with its terminal (e.g. terminal 21 of FIG. 4) with the associated mobility service provider.

The mobility service provider 41 could be a new service provider, such as MaaS operator (e.g. shared ride), bike sharing service provider, travel agency in addition to conventional transport operators such as car railway companies, tram operator, as mentioned.

The mobility service providers 41 connect to one another over the communication network, which is a logical connection, wherein a direct connection among operators or mobility service providers is not necessarily required, but it may require low latency and high throughput.

The entity or node 41 of a mobility service provider may have various functions, but there are two main functions, as also discussed above for FIG. 4, namely a passenger management function and the blockchain management function. The passenger management function supports booking of seat, booking of shared ride/taxi/car rental/seat reservation of train, monthly subscription or buying one-day ticket and so on. Like a normal e-commerce site, it provides a user interface of website or smart phone back-end processing.

On the other hand, the blockchain is hidden for the end-user in the present embodiment, but it is accessed with and by multiple mobility service providers. Additionally, in the present embodiment, a consortium (permissioned) blockchain is implemented among nodes 41, which validates the blockchain ledger among the mobility service providers which are members of the consortium.

In some embodiments, this above example is extended to international MaaS operation or MaaS operation in different regions. The blockchain is then defined as a multi-tier structure. The first tier blockchain is configured between countries or between regions and the second tier blockchain is configured in the consortium of the region. For example, a representative provider in regional consortium may join the first tier blockchains and handle the international services.

Figure 7:
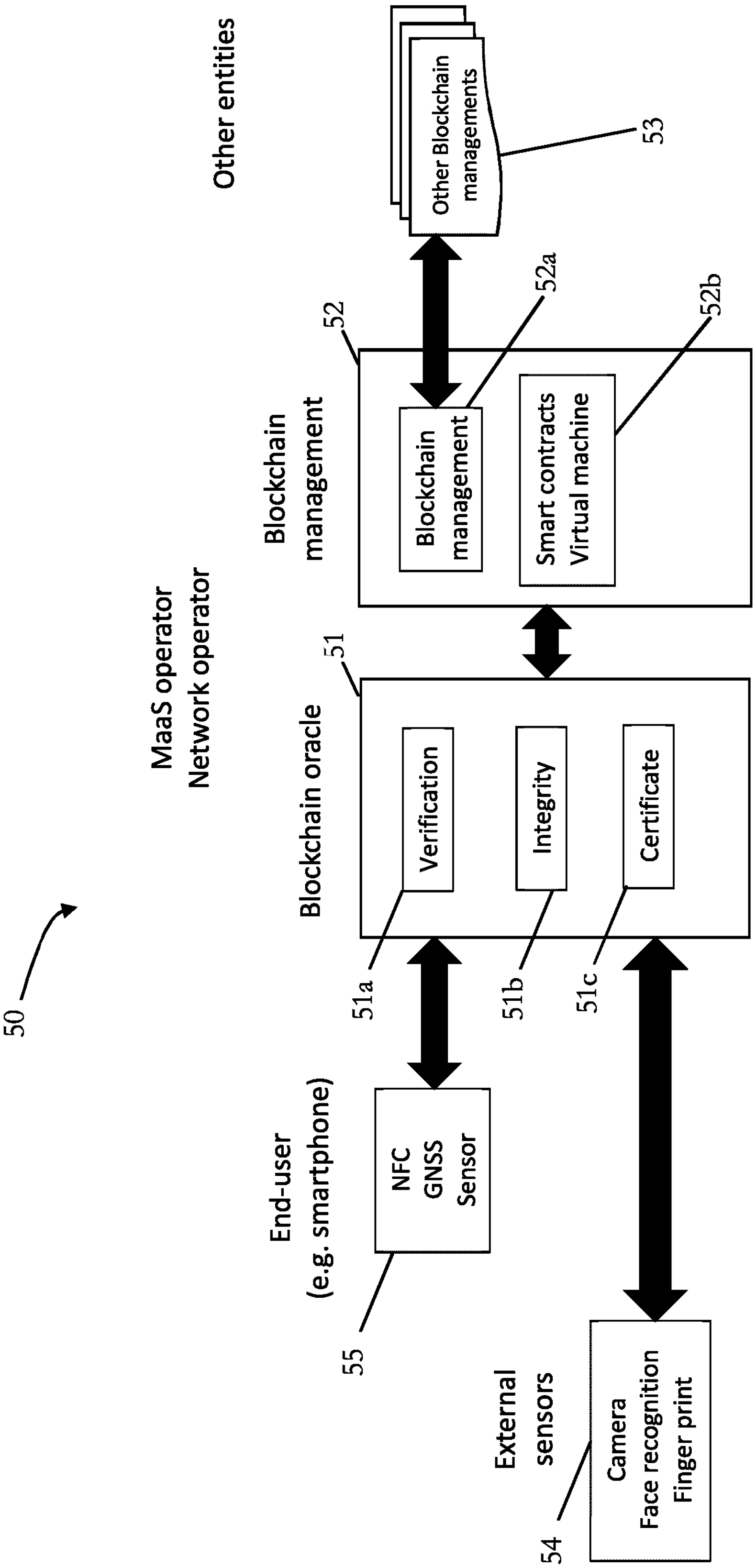
FIG. 7 illustrates a data flow of an embodiment of a MaaS system implementing a blockchain oracle.

In the following, an alternative embodiment of the MaaS system 20 of FIG. 4 is explained under reference of FIG. 7 illustrating a block diagram of a MaaS system 50.

Contrary to the embodiment of FIG. 4, in the present embodiment of the MaaS system 50, a blockchain oracle 51 is provided, including a verification block/function 51*a*, an integrity block/function 51*b* and a certificate block/function 51*c*.

Furthermore, in a blockchain management 52, additionally to a blockchain management bock/function 52*a* which communicates with other blockchain managements 53, a smart contract and virtual machine block/function 52*b* is provided.

Moreover, external sensors 54 are provided, such as a camera (for face recognition) or other sensors, e.g. for fingerprint detection, which can communicate with the blockchain oracle 51 (e.g. the certificate function 51*c*).

An end-user having a smartphone 55 with sensors (e.g. NFC, GNSS; or other sensors), can also communicate with the blockchain oracle 51 (e.g. with the verification function 51*a*).

The blockchain management function 52 may handle the smart contracts and the new function "blockchain oracle" 51 may handles the input data to smart contracts (e.g. input from sensors 54 and/or from sensors from the smartphone 55).

The smart contract is a kind of software code and it may be deployed in the blockchain in addition to data (e.g. in addition to journey data). However, as smart contracts are a kind of software, they typically need a central processing unit (CPU) for execution. Therefore, the virtual machine is provided, which may be configured as a platform of smart contracts and which may provide corresponding computing resources.

The blockchain oracle 51 is responsible for the correct input to the smart contracts in this embodiment and it is a kind of proxy server between the sensors 54 and the smart contracts. When the smart contracts access the data from the sensor 54, the target sensor may indicate it with a Uniform Resource Identifier (URI) or a Uniform Resource Location (URL) based on a Restful API: For example: "https://proxy.blockchainoracle.com/inputdevices/sensor1"

In this example, the URL "proxy.blockchainoracle.com/" is the blockchain oracle server name, and the part "input-devices/sensor1" is the identifier of the target sensor under the blockchain oracle 51.

The values may be return with Extensible Markup Language (XML) or Javascript Object Notation (JSON) format or the like.

However, the blockchain oracle 51 is not only a proxy server between the sensors 54 and that smart contracts, but it is also responsible for the validation of input and output for smart contracts.

For example, the blockchain oracle may verify the position/time stamp from the sensors 54. Furthermore, it may check the data integrity (unchanged) and it may certify whether the connected sensor is the correct one.

As mentioned, a smart contract is a kind of software code, and, thus the physical deployment is flexible. For example, the virtual machine can also separately run in the trusted cloud computer at a different (or any) location.

Generally, there exist many possibilities/combinations of deployment of various sensors with various ways and the present disclosure is not limited to specific examples in that regard.

In some embodiments, the type of verification or even if any verification is performed and/or whether a blockchain oracle is involved in the verification process, depends on the risk that the data which is input to the smart contract and/or received from the smart contract may be tampered. For instance, if a MaaS operator owns the database of install status/deployment environment of sensors or has the (exclusive) control over it and it is almost impossible to modify/tamper it (e.g. a security camera is installed on a tall tower, which the people cannot reach), a simplified (verification) procedure could be applied. For example, parts of the verification process may be skipped (e.g. instead of a double check a single check is performed), or the verification performed by the blockchain oracle is skipped (such that in some instances no blockchain oracle is involved/needed). In other words, depending on the degree of trust of the sensor(s), a reasonable level of verification may be applied in some embodiments.

In some embodiments, a simple way/common way is to use sensors in the passenger's smart phone/wearable devices. Alternatively (or additionally), one or more external sensors (e.g. camera) in the transport facility are deployed, e.g. of railway stations, airports, bus stop, station of bike sharing, streets and so on. For example, the airport or railway station may have multiple security cameras, which is used for or as MaaS sensors in some embodiments.

The MaaS operator/transport operator deploys the blockchain oracle 51 in this embodiment. However, in other embodiments, a third party may offer the services of the blockchain oracle 51 instead. For example, a telecom operator/mobile network operator who has internet of things (IoT) functions, location server, security functions, applications and services may offer the blockchain oracle function also in some embodiments.

Second Part

In the following, embodiments of a smart contract are discussed:

The smart contracts are stored in the blockchain as codes in addition to the data in the block.

The description or content of smart contacts is a kind of software code (e.g. JavaScript, Solidity) rather than human described natural language contracts. Thus, in some embodiments, there exist an IF-THEN-ELSE structure and conditions.

Generally, the smart contracts (computer language) may support at least one of the following, in some embodiments:

- Loop structure (if Turing-complete language)
- Complicated conditions like multiple variables, ternary operator
- Keep the value of internal variables (if stateful smart contract)
- Read/write/update of block in the blockchain
- Input/output from/to external machine/computer/network
- Direct negotiation between machines without intervention of human In the following an example of a smart contract is shown. However, there exist many computer languages for smart contracts and the following example of a smart contract is provided in a simplified pseudocode rather than a real computer language:

```
Begin
Variable :   TicketState (open, in-use, close)
If the ticket is issued and unused Then
   change TicketState to open
   End (if)
   Repeat (main loop)
   Receive the trigger from external
If the trigger is check-in Then
   change TicketState to in-use
   End (if)
If the trigger is check-out Then
   change TicketState to close
   Exit Loop
   End (if)
End (repeat)
Transmit the TicketState to external
End (begin)
```

This pseudocode checks, whether the ticket has been used or not and if it has not been used, its state is set to "open".

Moreover, it is checked, whether a trigger is received, wherein the trigger is, for example, a “check-in” event or a “check-out” event. If a “check-in” event is detected as trigger, the state of the ticket is set to “in-use” and if a “check-out” event is detected as trigger, the state of the ticket is set to “close”. At the end, the ticket state is transmitted, e.g. to the blockchain oracle 51 or to another instance.

Generally, a smart contract can be implemented in any computer system if its computer language is supported. In some embodiments, it is important to guarantee that the smart contrasts is authentic, and that it is not possibly to modify or change it. As discussed, in a blockchain changes/modifications are detectable due to the hash function output, which would change in such a case.

In the following, embodiments pertaining to a state transition in stateful smart contracts is discussed under reference of FIG. 8.

If the smart contract is stateful, it may have different behaviors depending on the current state. This is useful in some embodiments, in order to cover the (complicated) travel policy/transport tariff.

For example, a ticket may refundable before it is used, but, on the other hand, the refund should not be allowed for when the ticket has been used.

Figure 8:
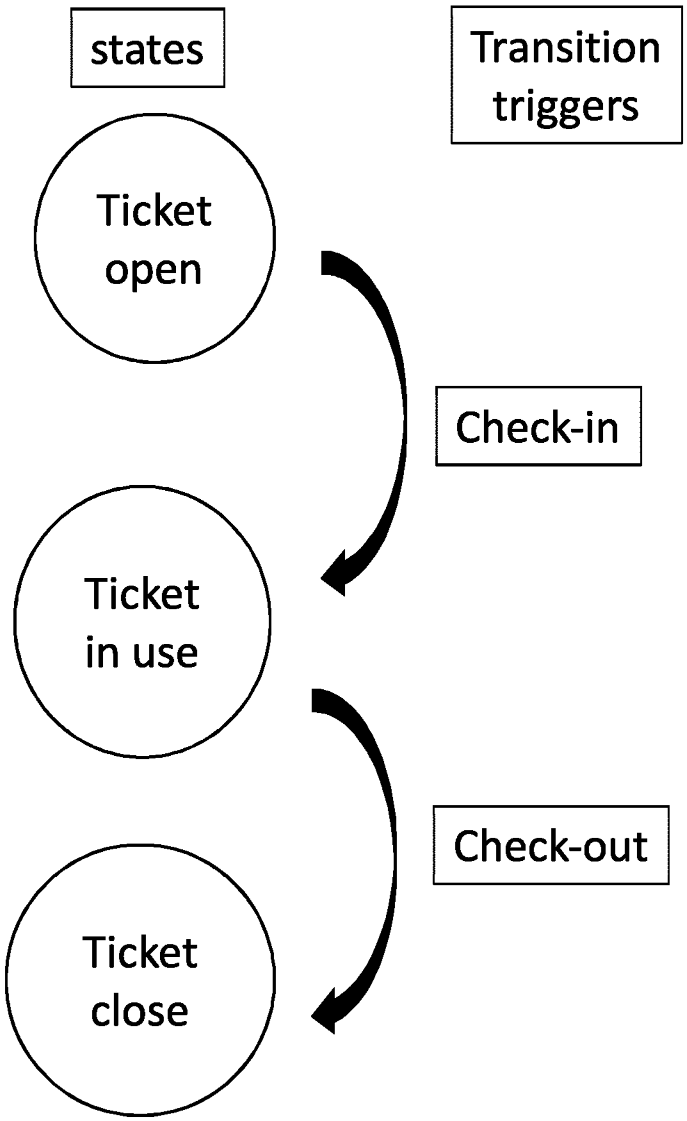
FIG. 8 shows a transition diagram illustrating transitions of a state of a smart contract.

FIG. 8 illustrates three different internal states of the associated smart contract.

In the beginning, when the ticket is issued, the state is “Open”, i.e. this ticket is valid, but not in use yet.

When the passenger meets the trigger condition of “check-in”, then the state transits to “in-use”, and then the ticket is no longer refundable.

When the passenger meets the trigger condition of “check-out” (e.g. arrived at the destination), the state is “closed”. The smart contract may check the condition of proper closing. For example, if the train is delayed three hours and in order to meet the train delay compensation condition, the smart contract may automatically execute the procedure of compensation.

The number of states/transition conditions may increase/decrease up to actual MaaS use cases and, thus, can be adjusted accordingly. For example, in some embodiments for air travel, the state of check-in (at counter) and that of boarding (at boarding gate) could be separately handled.

In some embodiments, the verification performed by the blockchain oracle includes verifying whether output data, which is based on an output from a smart contract, is correctly received at a predetermined device. For instance, as discussed, in FIG. 8 the smart contract makes an output about the ticket state which can be transmitted to the blockchain oracle, which then verifies whether, for example, this ticket state is correct and is associated with the correct ticket and user. Assume, for example, that in the case that a compensation is to be paid, the blockchain oracle may verify that the compensation is justified and that the information is sent to the correct predetermined device. Also, for example, if the ticket state is open, this information should be transmitted, for example, to the correct check-in device (or data base of the MaaS operator) and also to the correct mobile terminal of the correct user/passenger. Moreover, the blockchain oracle may verify that the output data is based on the correct smart contract, in order to avoid, for example, that tampered smart contract output data are used for changing ticket states, get compensations etc.

In the following, embodiments pertaining to the trigger of smart contract execution are discussed:

One factor of success of smart contracts is in some embodiments how to get a reliable trigger in addition to accurate conditions for a smart contract.

The execution of smart contracts relies on a trusted/accurate input, which is called “(blockchain) Oracle”, as also indicated above.

Figure 9:
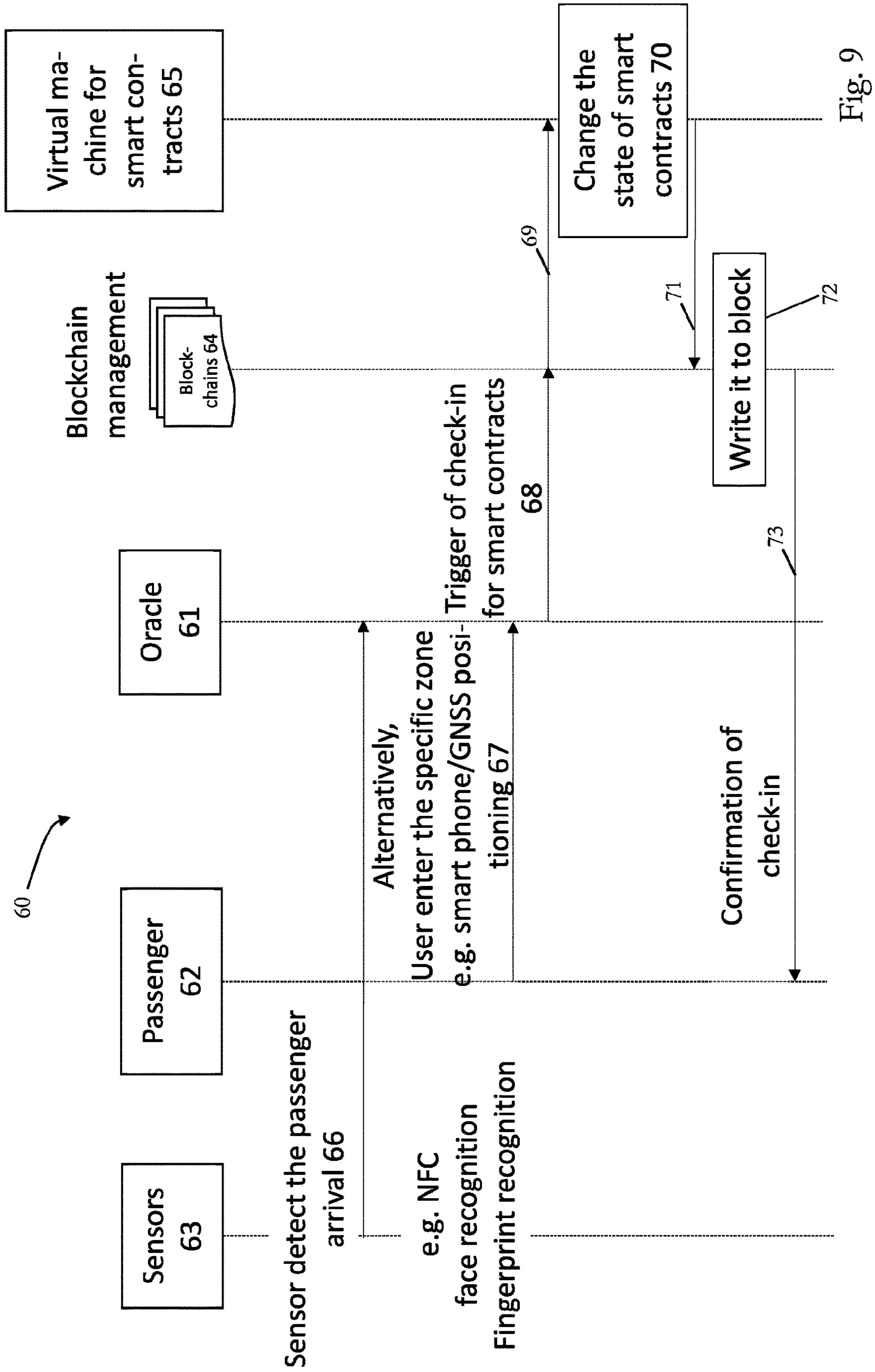
FIG. 9 illustrates a flow-chart of an embodiment of a method implementing a smart contract trigger with a blockchain oracle.

FIG. 9 illustrates a flow-chart of an embodiment of a method 60 implementing a smart contract trigger with a blockchain oracle 61. It is assumed that a passenger 62 travels with a MaaS service. The passenger 62 is about to check in. He or she has the unused ticket of a train in this embodiment.

In the check-in area sensor 63 are provided (e.g. camera, scanner for scanning ticket or the like, nearfield communication, sensor for face recognition, sensor fingerprint recognition, etc.), which are able to detect a passenger. Moreover, a blockchain management is provided which manages blockchains 64 including, as discussed above, for example, journey data, etc. A virtual machine 65 for smart contracts hosts and executes the smart contracts.

The method or process of check-in is as follows:

At 66, the sensor 63 (or one or more sensors of a sensor group 63) recognizes the passenger’s arrival in a specific zone/place (e.g. station entrance, gate, platform and so on.) and informs about the passenger’s arrival to the blockchain oracle 61. Alternatively, at 67, one or more sensor of the sensors in a passenger’s smartphone, wearable devices or the like detects the specific zone and sends a trigger indicating the check-in or the current position of the passenger 62 to the blockchain oracle 61 or directly to the block chain management server 64.

The blockchain oracle server 61 receives the input from the sensor(s) (see 66 and/or 67) and checks the validity of them such as position, data integrity of the sensor which provided the sensor data sent to the blockchain oracle server 61, the certification of connected sensors, etc.

At 68, the blockchain management function 64 receives the trigger indicating the check-in, which initiates execution of the relevant process of the smart contract.

At 69, the blockchain management transmits the trigger to the virtual machine 65 which executes the relevant code of the associated smart contract according to the trigger/input/condition change, and then it changes at 70 the internal state (e.g. ticket open→check-in complete), as had also been discussed under reference of FIG. 8 and transmits a corresponding message at 71 to the blockchain management server.

At 72, the blockchain management function writes the status change in the block according to the result of the smart contract execution (if necessary). For example, if the multi-operator ticket was invalidated, it should be recorded in the blockchain.

At 73, the blockchain management function informs the ticket state to the passenger (optionally). For example, the passenger can take the ticket state change from the smart phone screen or wearable device, where a corresponding message is displayed (or any other indicia is displayed indicating the change of the ticket status).

In some embodiments, one important responsibility of the blockchain oracle 61 is to guarantee the right input to the smart contracts, since if the input information is wrong/inaccurate, the wrong procedure is executed, even if the smart contract is correctly described. Regardless of human error, machine malfunction/break down, malicious attack (e.g. spoofing), etc., it is the aim that the blockchain oracle 61 must prevent the wrong execution of smart contracts due to wrong input/conditions.

In some embodiments, the oracle 61 may be omitted, for example, if the sensors and/or servers are deployed by a trusted member and it is impossible to change, or to modify the data by someone else.

In the following, an embodiment of the detection of a passenger's arrival is discussed (positioning/zone detection):

For the check-in detection, there are exist embodiments of corresponding methods.

For instance, in some embodiments, a QR code/NFC or the like is used detecting an arrival of the passenger (e.g. by scanning a QR code on a ticket, using NFC of a passenger's smartphone, etc.). Although, such technologies are known per se, in some embodiments, there is a need of verification for the smart contracts.

In some embodiments, a location based solution is provided which may involve accurate positioning techniques, which is useful for MaaS services, since thereby the position of a passenger can be accurately determined. On other embodiments, biometric-based solutions are implemented, which is also useful for MaaS applications (in some embodiments also location and biometric based solutions are combined).

In the following, an embodiment is discussed, which is based on a conventional ID (identification), for the detection of the arrival (or check-in) of a passenger.

An example for a of conventional ID/passenger arrival detection is as follows:

1. passenger name and its password are detected at a check-in machine
2. the passport is shown at the check-in machine (e.g. for scanning personal data of the passenger)
3. contact of NFC sensor, e.g. of the smartphone, is detected at a check-in gate or boarding gate
4. Show e-ticket with bar code/QR code at the gate or at a reader
5. Input with user interface of smart phone/PC at check-in location.

In some embodiments, by using this method, many manual/human based checks are involved in the check-in process. If someone makes and uses a counterfeit ticket on the smartphone screen and shows it at the gate, the human person cannot easily verify it and recognize that this ticket is a counterfeit ticket.

In the following, an embodiment is discussed, where a location-based (geo-fencing) solution is implemented.

For example, in cases where a passenger has a (high-end) smart phone or advanced wearable devices, there are various sensors in it provided. In that case, a location-based detection is applicable with one sensor (e.g. GPS sensor) or with a combination of two or more sensors.

For example, the previous generation GNSS (global navigation satellite system, e.g. GPS satellite) may have an accuracy of 30 m-50 m. Current satellite systems, such as Galileo encrypted, QZSS, quasi Zenith satellite system) or combinations of multiple satellites may achieve an accuracy on decimeter-level (e.g. 50 cm) or even an accuracy of the cm level, wherein this level of accuracy is useful for MaaS in some embodiments. In addition, in some embodiments, a combination of indoor positioning methods is implemented, which is useful for MaaS, wherein the positioning system may have very accurate clock/time stamp, which is also useful for MaaS.

In the embodiments, at least one of the following sensor/positioning methods for location-based solution are implemented, wherein each of them can be combined in any manner with each other: GNSS positioning (e.g. GPS); High accuracy satellite positioning system (Galileo encrypted, QZSS, RTK (real time kinematic) based positioning or the like); WiFi (wireless network) based positioning; cellular based positioning (e.g. OTDOA (Observed Time Difference Of Arrival), UTDOA (Uplink-Time Difference of Arrival), base station beamforming or the like); inertial measurement unit (IMU) based positioning (e.g. Gyro sensor, Acceleration sensor, e-compass or the like); Beacon signal (e.g. Low power Bluetooth (BLE)); Location maker (e.g. QR code printed at specific location) recognition with smartphone camera/image processing, and/or NFC based location detection.

The passenger, i.e. the passenger's smartphone/wearable device or the like detects the specific zone (for check-in) and sends the position or trigger to the blockchain oracle or directly to the blockchain management server. The challenge of this method is in some embodiments how to prevent GNSS spoofing or inaccurate positioning. Thus, in some embodiments, the blockchain oracle may double check the passenger's position with different methods, as will be discussed in the following.

In the following, an embodiment implementing a position/location/time stamp verification is discussed.

The blockchain oracle may double check the validity of position/location from the sensor. In addition to the location, a time stamp/clock can be verified also because the location service usually uses the accurate clock sources. As a result, the blockchain oracle may improve the accuracy of position by taken into account further position signals of more than one sensor.

For instance, two types of positioning systems may be combined (or even more than two). For example with GNSS, using more than one satellite for double checking, for example of: GPS (USA), GLONASS (Russia), BeiDou (China), Galileo (Europe) and QZSS (Japan). An example of indoor positioning, the blockchain oracle may use Bluetooth beacon, WiFi signal positioning, cellular signal, etc. In general, it might be easy to tamper one system, but it is assumed to be very difficult to tamper multiple systems at the same time. And it should be more difficult to tamper if the systems in use are randomly selected among more than two, as it is the case in some embodiments.

Moreover, in some embodiments, a double checking with user terminal positioning and network based positioning is provided. For example, the smartphone sends the own current position to a network location server and the network location server may double check with a network based positioning (UTDOA), whether the position is correct.

Moreover, also a time stamp may be checked in some embodiments. For instance, the UE internal clock and a network clock (e.g. network time protocol, NTP) or satellite clock (GNSS clock) may be used for comparing associated time stamps.

In some embodiments, a vision based location identification is implemented, as is discussed in the following.

If the end user or any vehicle has a camera/video, image/video processing/computer vision function or the like, it can be used to identify the current position/location of the end user. The autonomous driving car/advanced safety car may have a camera and a function of simultaneous localization and mapping (SLAM) for identifying the position/situation. For example, the camera/video processing recognizes the entrance of motorway/highway, and then it may send the current position or status change (on the highway) to the blockchain oracle.

Third Part

Figure 10:
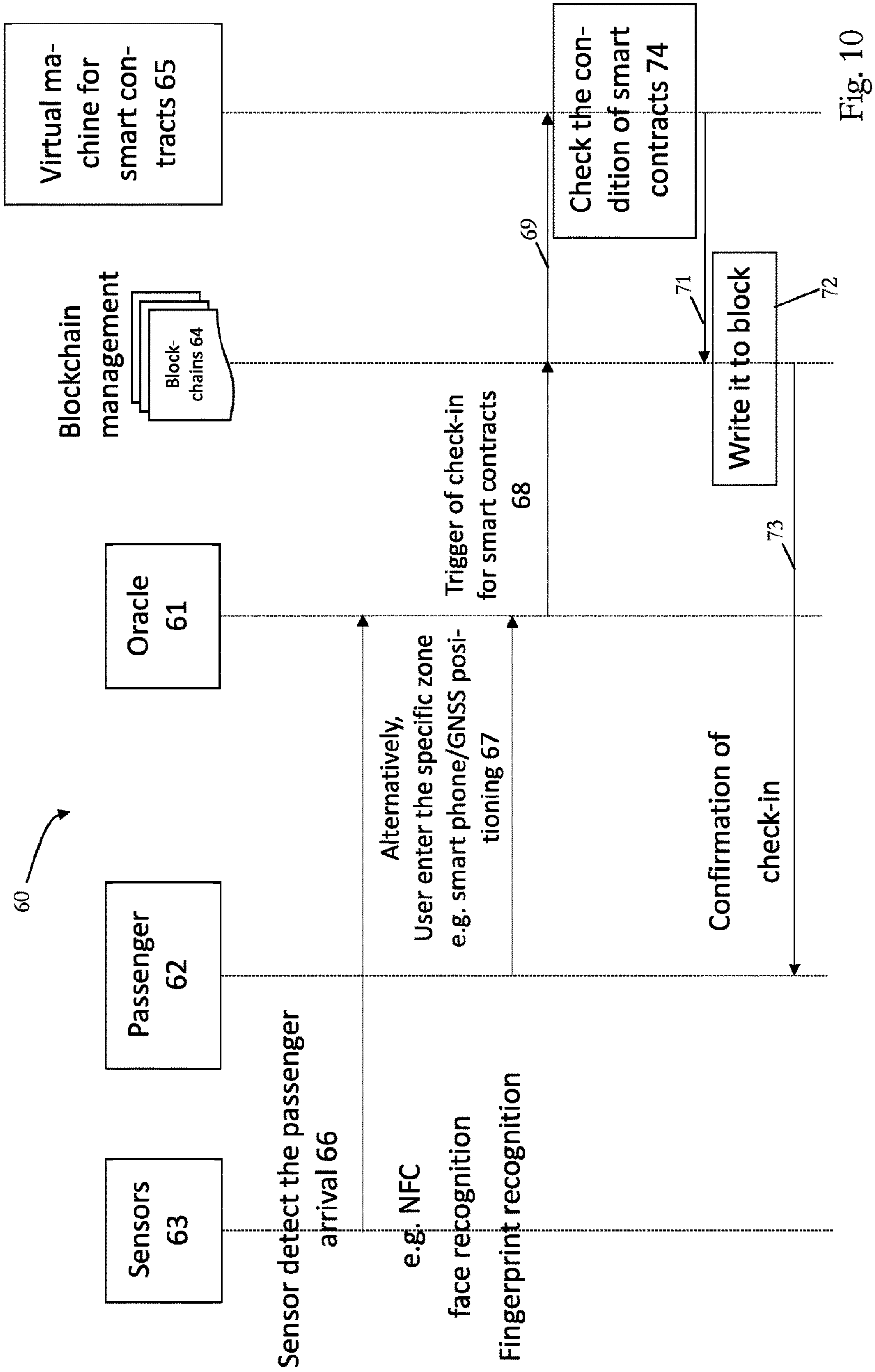
FIG. 10 illustrates a flow-chart of an embodiment of a method implementing an off-peak condition for smart contracts.

FIG. 10 illustrates the embodiment of the method 60 implementing a smart contract trigger with a blockchain oracle 61, wherein a check 74 of the condition of smart contracts is introduced (e.g. in addition to change 70 of the smart contract of FIG. 9 or at a later point of time, etc.).

In this embodiment, it is assumed that the passenger travels with a MaaS service and that the passenger has a ticket/subscription of off-peak travel.

Figures 11, 12:
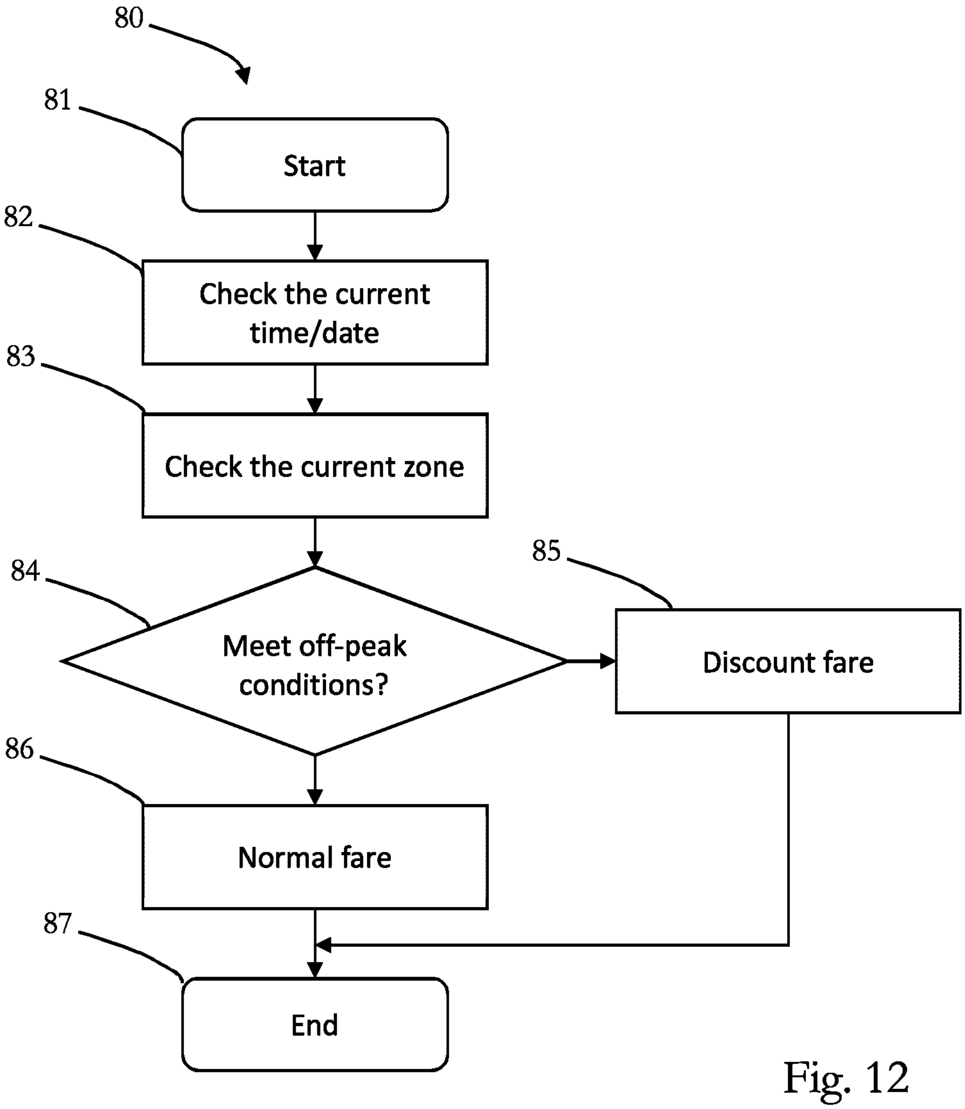
FIG. 11 illustrates an off-peak condition for a smart contract.
FIG. 12 illustrates a flow-chart of an embodiment of a method for implementing off-peak conditions.

FIG. 11 illustrates an example of off-peak conditions. Generally, depending on the city/area, the off-peak conditions include various cases and the combination of day/time and location/zone/direction are typical off-peak conditions, which avoid or at least attenuate busy hour of daily commuter. In the opposite way, peak conditions or busy conditions can be defined (e.g. sightseeing visitors, etc.).

In FIG. 11, the off-peak conditions include time/date and zone/direction parameters, wherein the time/date parameters defined on weekdays time slots as off-peak conditions: morning, before 6 a.m., daytime between 10 a.m. and 4 p.m. and evening after 8 p.m., and the whole day on Saturday and Sunday.

Moreover, zones A to C and as directions in the Morning west bound and in the evening east bound are set as off-peak conditions.

Hence, a passenger who has an off-peak ticket can only use this ticket (or get the reduced off-peak ticket price) in cases that he meets the off-peak conditions.

The process of smart contracts (off-peak) involves that, for example, in the beginning, a sensor (e.g. of the sensors 63) recognizes the passenger's arrival in the specific zone/place (e.g. station entrance, gate, platform and so on) and informs the oracle 61 about the passenger's arrival. Alternatively (at 67), as discussed, also the sensors in passenger's smartphone, wearable devices or the like may detect the specific zone and send a trigger of check-in or the current position to the blockchain oracle 61 or directly to the block chain management server 64.

At next, the blockchain oracle server 61 receives the input from the sensor(s) and checks the validity of them, i.e. checks whether a position is correct, data integrity of the sensor is fulfilled, the certification of the connected sensors is correct, etc.

Then, the blockchain management function/server 64 receives the trigger of check-in at 68, which initiates to execute the relevant process of smart contract, as also discussed above under reference of FIG. 9.

At next, the virtual machine 65 checks and executes the relevant codes of smart contract according to the current conditions at 74, wherein, depending on associated input conditions, different processing may occur (see also discussion further below).

Then, the blockchain management function/server 64 writes the status change in the block of the blockchain according to the result of smart contract execution (if necessary). For example, when the multi-operator ticket was invalidated, this is recorded in the blockchain.

In the following, an embodiment of a method 80 pertaining to pre-defined conditions (off-peak), which may be performed by the system explained under reference of FIGS. 9 and 10, will be explained under reference of FIG. 12 showing a flowchart of the method 80.

At 81, the method starts, and at 82, the smart contracts (running on the virtual machine) check the current time by accessing an internal clock of the server of the virtual machine (or by accessing an external Network Time Protocol (NTP) server or other time sources).

At 83, the smart contracts (running on the virtual machine) check the current positioning information, wherein the smart contracts can get the passenger's position information from the blockchain oracle server or a location server (e.g. SUPL (Secure User Plane Location) server) or any other location information source.

At 84, the smart contracts compare the pre-defined conditions (the date/time and the location/direction) in smart contracts and above current information. If the off-peak criteria are met, the smart contract applies for the off-peak discount (or allows to use the transport) at 85. However, if the off-peak criteria are not met, it is applied for normal fare (or it is not allowed to use the transport) at 86. If necessary, internal states/variables of the smart contract are changed accordingly (e.g. ticket status, the amount of charge or the like). At 87, the method 80 ends.

Fourth Part

In the following an embodiment of a smart contract procedure or method 90, e.g. in the case of transport service disruption, delays or the like is discussed under reference of FIG. 13.

Figure 13:
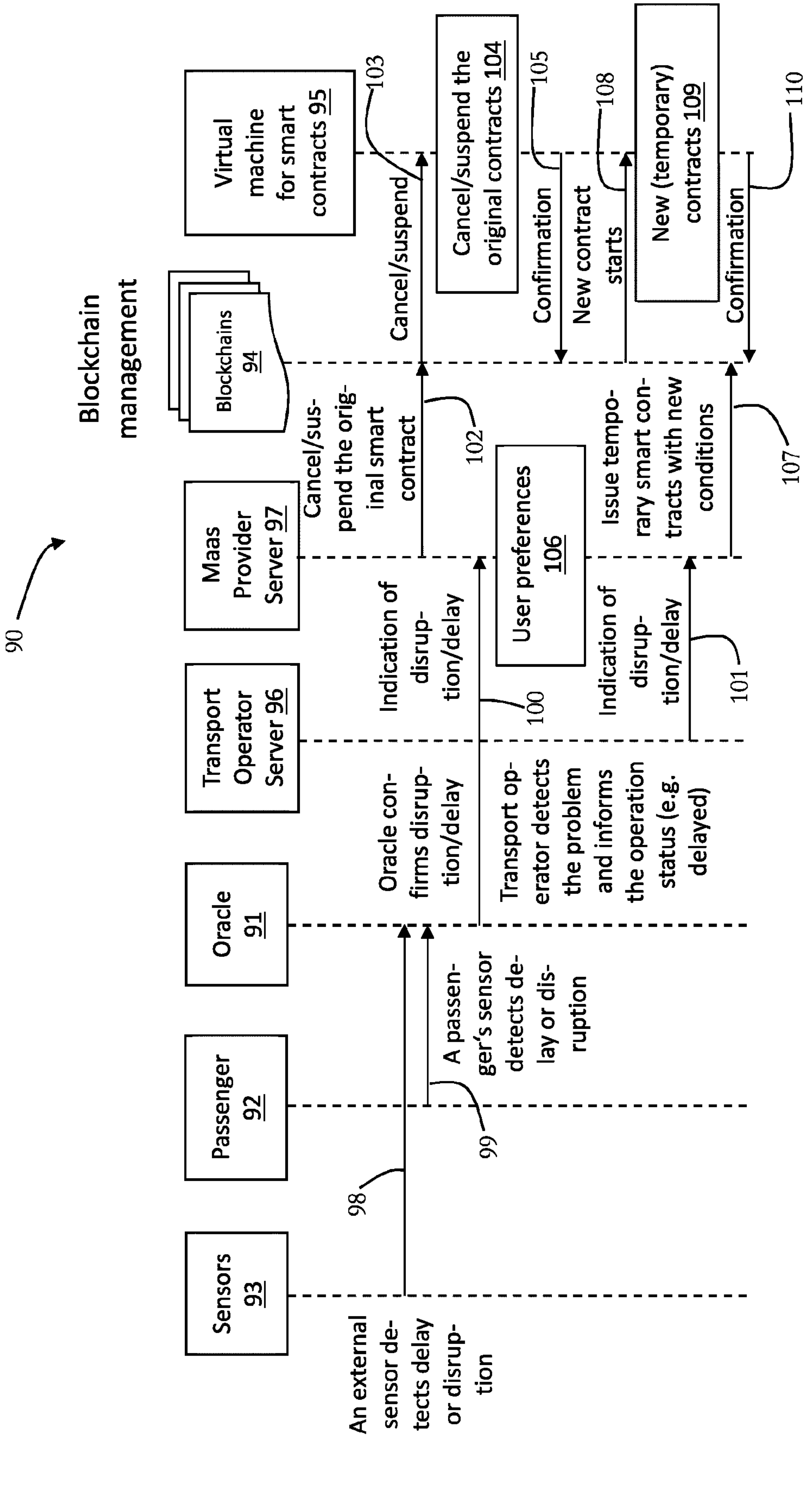
FIG. 13 illustrates a flow-chart of an embodiment of a method implementing adapting a smart contract in the case of a delay/disruption of a transport.

As can be taken from FIG. 13, there are provided: a blockchain oracle 91 (similarly to blockchain oracle 61 as discussed above with respect to FIG. 9), a passenger 92, sensors 93, a blockchain management function/server 94 (similar to the blockchain management function/server 64 of FIG. 9), a virtual machine 95 for smart contracts (similar to the virtual machine 65 of FIG. 9), and a transport operator server 96 and a MaaS provider server 97.

In this embodiment, the case of delay is considered (without limiting the present disclosure in that regard). In conventional cases, when a transport service is disrupted due to an accident or a break down, the ticket is cancelled and the ticket is refunded to the passenger 92.

However, in multi modal MaaS, there are provided several options for passengers, for example:

- Cancel ticket and fully refund it
- Accept the delay and a compensation is granted, which depends on the delay time/amount of delay
- Use an alternative route if there are multiple routes to a destination
- Use an alternative transport system (e.g. from tram to bus)

Generally, there are some special notes in MaaS case, which are addressed in the embodiments.

For instance, the MaaS service may be provided based on monthly subscription service, and, thus, cancelling and refund of a monthly ticket may not be a useful option.

Moreover, MaaS may support multiple types of transportation. However, there may be provided restrictions. For example, the passenger can use a taxi within pre-defined range (e.g. within 5 km or the like) in the case of a delay/disruption, but if the passenger wants to go a larger distance, the passenger is required to pay the additional costs. In another example, passengers can take railways, but the route/zone/transit point may be restricted. For instance, a passenger can take local trains, but he is not allowed to take long distance trains.

In the present embodiments, these exemplary restrictions are pre-defined in the smart contracts depending on the type of service agreements between a passenger and MaaS provider.

As discussed above, as conventional smart contracts are immutable owing to blockchain, in the present embodiments a compromise between flexibility and stability of smart contracts is provided.

In FIG. 13, in the beginning, the sensor(s) 93 can detect a disruption of transport or a delay. For example, a security camera (a sensor 93) cannot detect at a planned time in a planned railway station that a passenger enters a train accordingly, wherein in such a case the sensor 93 may send a trigger indicating a delay at 98. Additionally, or alternatively, also the oracle server 91 may recognize that the train is delayed, if, for example, the passenger 92 cannot be detected at a planned time e.g. entering a train or cannot be detected in a train.

Alternatively (or additionally), a passenger's 92 sensor (e.g. in a smartphone or wearable device carried by the passenger) can detect the disruption/delay. For example, a smartphone application uses a GNSS (global navigation satellite system) sensor or any other positioning sensors for detecting the location of the user (passenger 92) of the smartphone. The application detects a deviation from the original schedule and then the application sends a report of disruption/delay to the oracle server 91 at 99.

The oracle server 91 may double check the disruption/delay with multiple sources, if necessary. If the oracle server 91 can confirm the delay/disruption, the oracle server 91 indicates the delay/disruption to the MaaS provider server 97 at 100.

Alternatively (or additionally), if the transport operator provides an operation status server (transport operator server) 96 (e.g. status of train delay/cancel, flight information of delay/cancel), the transport operator server 96 reports the disruption/delay to the Maas provider server 97 at 101 (or the MaaS provider server 97 accesses the application interface (API) of the transport operator server 96 for obtaining the corresponding information, wherein an API of transport operators for provide operation status is generally known).

In the following, the procedure of updating a smart contract is explained. As mentioned before, the smart contracts are originally immutable.

Stop the Existing Smart Contracts

At first, the MaaS provider server 97 is aware of disruption/delay, since it was recognized accordingly, as discussed above. In response to that, it initiates the canceling of an existing smart contract by transmitting an associated message at 102 to the blockchain management function/server 94.

Then, in response to the message sent at 102, the blockchain management function/server 94 sends a stop command (cancel or suspend command) to the virtual machine 95 at 103.

In response to the stop command transmitted at 103, the virtual machine 95 stops (cancels or suspends) the instance/process of the current smart contract(s) at 104 and sends a confirmation back to the blockchain management function/server 94 at 105. In this embodiment, the instance/process is a unit of software execution on the cloud/server, e.g. of the virtual machine 95.

Renewal of Smart Contracts with New Conditions

The MaaS provider server 97 gets a user preference of exceptional cases at 106. The user preference may be stored in a user profile of the passenger or the user/passenger may be asked via a user interface (e.g. smart phone) for the corresponding user preference. For example, if the delay is likely to be more than one hour, the passenger is willing to select a diverted or alternative route via another station "x" rather than the (original) direct route.

Based on the user preferences and service agreement of MaaS subscription, the MaaS server 97 issues at 107 a new (temporary) smart contract and sends it to the blockchain management function/server 94.

The blockchain management function/server 94 starts the virtual machine 95 for the (new) smart contract(s) at 108 by sending a corresponding command/message to the virtual machine server 95 and in response to that the virtual machine 95 starts the process/instance of smart contracts and sends a confirmation back to the blockchain management function/server 94 at 110.

Although, embodiments herein focus on MaaS as use case, the general idea of the present disclosure can also be applied to other applications, such as internet of things (IoT) smart contracts, financial transaction (Fintech), telecommunications/internet services, etc.

Figure 14:
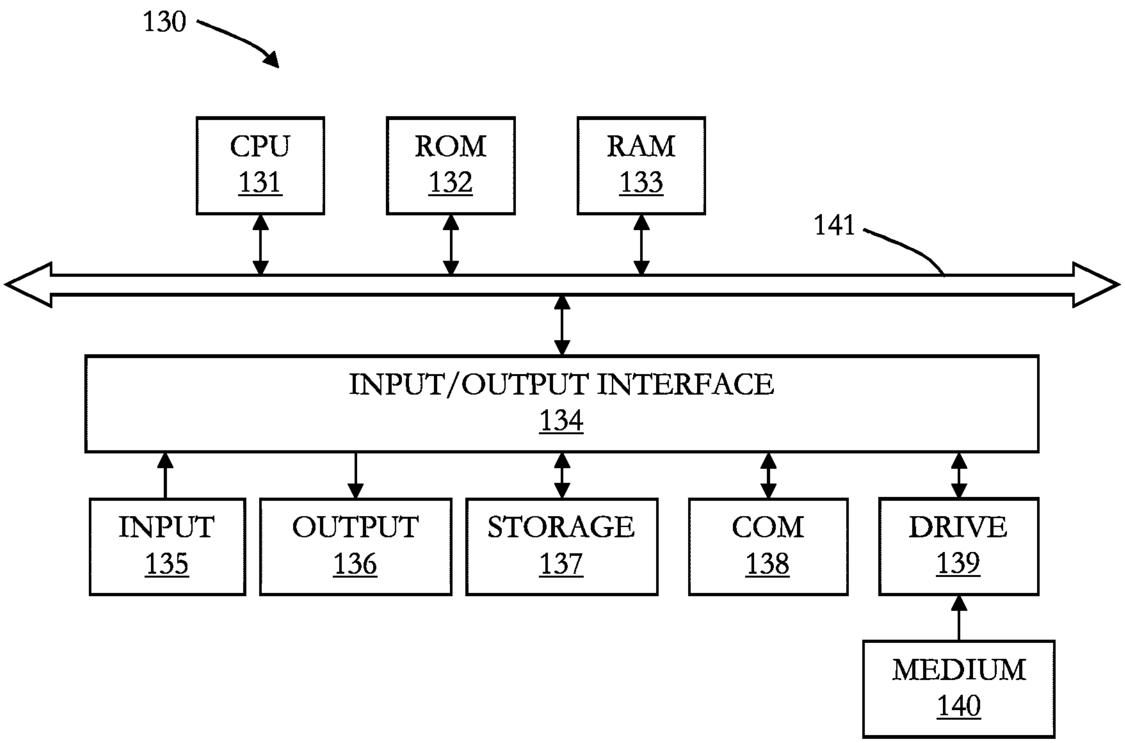
FIG. 14 illustrates an embodiment of a general-purpose computer on the basis of which a network equipment or a communication device is implemented in some embodiments.

In the following, an embodiment of a general purpose computer 130 is described under reference of FIG. 14. The computer 130 can be implemented such that it can basically function as any type of network equipment, e.g. a base station or new radio base station, transmission and reception point, or communication device, such as user equipment, (end) (mobile) terminal device or the like as described herein. The computer has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 15:
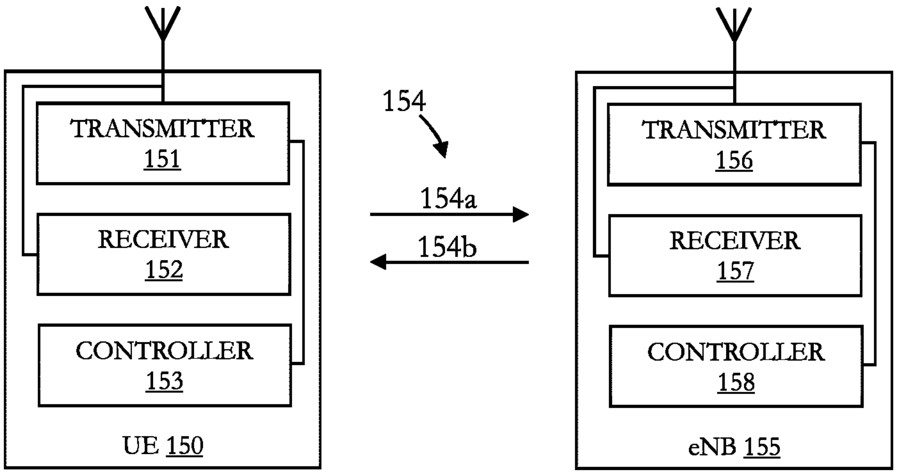
FIG. 15 illustrates an embodiment of an eNodeB and a user equipment communicating with each other.

An embodiment of a mobile terminal, configured as user equipment UE 150 and an eNB 155 (or NR eNB/gNB) and a communications path 154 between the UE 150 and the eNB 155, which are used for implementing embodiments of the present disclosure, is discussed under reference of FIG. 15. The UE 150 is an example of a communication device and the eNB is an example of a base station (i.e. a network equipment), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154*a*, which is from the UE 150 to the eNB 155, and a downlink path 154*b*, which is from the eNB 155 to the UE 150.

During operation, the controller 153 of the UE 150 controls the reception of downlink signals over the downlink path 154*b* at the receiver 152 and the controller 153 controls the transmission of uplink signals over the uplink path 154*a* via the transmitter 151.

Similarly, during operation, the controller 158 of the eNB 155 controls the transmission of downlink signals over the downlink path 154*b* over the transmitter 156 and the controller 158 controls the reception of uplink signals over the uplink path 154*a* at the receiver 157.

Further summarizing, as is apparent from the description, some embodiments pertain to a communication network node (or method for controlling a communication network having multiple such nodes) for providing data to a distributed ledger, wherein the node has circuitry configured to provide a special condition for a smart contract, and verify whether the special condition is met.

The communication network node may be a network equipment, such as a base station, eNodeB or the like, but the node may also be configured as a communication device, such as a user equipment, an (end) terminal device or the like (e.g. mobile phone, smartphone, computer, laptop, notebook, etc.) which has circuitry which is configured accordingly. In particular, the communication network node may be a blockchain oracle as discussed herein.

In some embodiments, the distributed ledger includes (or is) a blockchain, wherein the blockchain may include multiple blocks.

In some embodiments, the distributed ledger includes data for mobility as a service.

In some embodiments, the access to the distributed ledger is granted based on a permission right, wherein the node may be part of a consortium. The consortium may be provided by the mobility service provides, wherein, for example, each node may correspond to or may be associated with one mobility service provider.

As discussed, the distributed ledger may include a blockchain, wherein the blockchain may include multiple blocks, the block including the non-sensitive user data, and wherein the distributed ledger may include data for mobility as a service. Hence, in some embodiments, the communication network and its nodes are configured to provide MaaS.

The special condition may include a time condition or a location condition, e.g. the special condition is a condition for a ticket such as an off-peak condition.

The distributed ledger may be updated in dependence on the verification whether the special condition is met.

Some embodiments pertain to a communication network node (or method for controlling a communication network having multiple such nodes), as discussed, for providing data to a distributed ledger, wherein the node has circuitry configured to recognize a service disturbance, the service being defined on the basis of a smart contract, and adapt the smart contract on the basis of the recognized service disturbance.

As discussed, the service may be mobility as a service and the disturbance includes a transport delay or transport disruption. The service disturbance may be recognized on the basis of sensor data wherein the sensor data may be are provided by an electronic device worn by a user (e.g. a mobile terminal, smartphone, wrist band, smart watch, smart glasses, etc.).

The sensor data may also be provided by an electronic device mounted at transport station (e.g. a camera, fingerprint sensor, ticket sensor or the like).

Hence, in some embodiments, the sensor data may be provided by at least one sensor included in a mobile terminal of the user (e.g. a positioning sensor, imaging sensor, fingerprint sensor, etc.) or the sensor data may be provided by at least one sensor detecting a user (e.g. a sensor which is located at an arrival site or check-in, boarding or the like which the user enters and where the user is detected).

The disturbance may be recognized by checking a transport status provided by a transport operator, wherein the transport status may be checked over an application programming interface of a transport operator server.

The smart contract may be adapted by stopping, cancelling, suspending, amending or providing a new smart contract. The smart contract may be adapted on the basis of a user preference, wherein the user preference may be stored in a user profile or the user preference is requested from the user.

The smart contract may be temporarily adapted (e.g. until the disturbance is removed).

Some embodiments pertain to a mobile terminal, as discussed herein, for communicating with a network node, as discussed herein, for providing data to a distributed ledger, wherein the mobile terminal has circuitry configured to provide data to the network node for verifying whether a special condition of a smart contract is met. As mentioned, the mobile terminal may have at least one sensor, wherein the data are provided on the basis of sensor data of the at least one sensor, wherein the at least one sensor may provide position data or biometric data. The circuitry may be further configured to perform an application, the application configured to provide the input data to the network node, wherein the application maybe a mobility as a service application. In some embodiments the mobile terminal may be a smartphone (or another wearable device, as mentioned above).

The application is configured to determine a check-in of a user, based on sensor data provided by a sensor of the mobile terminal.

Some embodiments pertain to a mobile terminal (as discussed herein) for communicating with a network node (as discussed herein) for providing data to a distributed ledger, wherein the mobile terminal has circuitry configured to recognize a service disturbance, the service being defined on the basis of a smart contract.

As mentioned, the service may be mobility as a service. The disturbance may include a transport delay or transport disruption, wherein the service disturbance is recognized on the basis of sensor data.

The mobile terminal may further include at least one sensor, wherein the data are provided on the basis of sensor data of the at least one sensor, wherein the at least one sensor may provide position data or biometric data. The circuitry may be further configured to perform an application, the application configured to provide the input data to the network node, wherein the application may be a mobility as a service application. The mobile terminal may be a smartphone, as discussed. The application may be configured to determine a check-in of a user, based on sensor data provided by a sensor of the mobile terminal.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future.).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The term "Mobility as a service (MaaS)", is also known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

A "Public blockchain/distributed ledger" means in some embodiments, that anyone can share the distributed database (ledger) and join to execute the consensus protocol, as also indicated above.

In contrast to that, a "Permissioned blockchain/distributed ledger" means that only permitted members can share the distributed database (ledger) and join to the consensus protocol. Permitted members which have the permission to access the blockchain are called "consortium", as indicated above. In some embodiments, permissioned/consortium type blockchains are suitable for MaaS application, since they are not public and, thus no one can access it.

The term "Instance" is understood as a software process running on a cloud. It may move somewhere in the distributed cloud.

A "Public cloud" may be defined as (https://azure.microsoft.com/en-gb/overview/what-are-private-public-hybrid-clouds/): "Public clouds are the most common way of deploying cloud computing. The cloud resources (like servers and storage) are owned and operated by a third-party cloud service provider and delivered over the Internet."

In some embodiments, the following terms will be used in the given understanding:

The term "multimodal transport pass" may be a pass which is valid for multi mobility services with specific conditions, such as valid period or available transport, unacceptable services, etc. For instance, a one-day ticket, one-week ticket, monthly MaaS service subscription, seasonal ticket, etc.

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like.

The term "Pass" may be a transit pass or travel card (UK) (see also https://en.wikipedia.org/wiki/Transit_pass). In the present disclosure, a multi-modal pass shall also fall under the term "pass", which means that the pass may be valid among more than one transport operator (or mobility service provide) and, thus, it may cover not only public transport, but also cover other types of mobility, such as ride share, bike share, etc. The pass may include the information of acceptable transport, valid period, and any other conditions of ticket issue/transport ride. The MaaS may provide a monthly service subscription with some option of service level in some embodiments. A passenger or user may pay the service subscription fee or purchase of specific period pass to a pass issuer (which may typically be a mobility service provide which issues the pass). The pass may be issued by transport operators or travel agencies, MaaS service provider, etc. (which may all fall under the term mobility service provider as discussed above). Hence, as mentioned, some of the pass issuers may sell a pass, but may not provide the actual transport service or transport means.

The term "Ticket" may be a ticket for a one-way journey of the specific section like one-way train ticket with (or without) seat reservation. The ticket may be issued under the multi-modal transport pass and its terms and conditions in some embodiments and it may include the information of selected transport, seat number, price, etc. In some embodiments, even if no seat reservation is required or unlimited travel is allowed, the ticket may be issued for revenue sharing among multiple mobility service providers. Moreover, a passenger (user) may not directly pay for a ticket issuer, but a pass issuer may pay for the ticket issuer instead of the passenger and the ticket may be issued by a transport operator or service provider, i.e. by a mobility service provider.

The term "Journey log" may cover a journey log which is a one-way journey record based on the ticket. It may include information about the location of embankment, time/day of it, the location of alight, time/day of it, whether the ticket is used or unused, etc., which will also be discussed further The term "Smart contract" is generally known and Wikipedia, for example, explicates (https://en.wikipedia.org/wiki/Smart_contract): "A smart contract is a computer protocol intended to digitally facilitate, verify, or enforce the negotiation or performance of a contract. Smart contracts allow the performance of credible transactions without third parties. These transactions are trackable and irreversible. Smart contracts were first proposed by Nick Szabo, who coined the term, in 1994. Proponents of smart contracts claim that many kinds of contractual clauses may be made partially or fully self-executing, self-enforcing, or both. The aim of smart contracts is to provide security that is superior to traditional contract law and to reduce other transaction costs associated with contracting. Various cryptocurrencies have implemented types of smart contracts."

Smart-contract languages, which may be used in some embodiments without limiting the present disclosure in that regard are computer languages for describing smart contract in the blockchain and may run/execute on the virtual machine for blockchain. Additionally, there are various languages which may be used for it. For example, Ethereum project's Solidity team has developed the smart-contract language "Solidity".

The term "Blockchain Oracles" is understood in some embodiments in a sense as also disclosed under https://blog.apla.io/what-is-a-blockchain-oracle-2ccca433c026: "What is an oracle? According to various online dictionaries, an oracle can be defined as an "authoritative or wise expression or answer" or "a person or thing regarded as an infallible authority on something". In fact, dictionaries themselves can be regarded as oracles but what does this have to do with blockchains? What is a blockchain oracle?

To understand blockchain oracles the reader should first be familiar with blockchains and smart contracts. A smart contract is software code that runs on a blockchain network such as Ethereum or Apla and performs actions or tasks based on certain events. The most obvious example is sending a transaction on the Ethereum network where I provide the receiver's address and proof that I have and own the funds, to the network. If everything checks out, the network will 'transfer' the funds to the receiver." It is further explicated that for decentralized applications which need external data, such as the current weather temperature, the price of a stock or even the results of the FIFA World Cup finals, the question is how a smart contract, or, in other words, a piece of code on a blockchain, gets the information and in such cases oracles for blockchain applications may be used. Moreover, "Oracles are trusted data sources or entities that provide information or sign claims about the state of the world for smart contracts. They are the link between real world events and the digital world of blockchain platforms. They don't make predictions about the future but report events from the past."

The term "Stateful/Stateless smart contract" is understood in some embodiments, as follows: Stateful means to keep an internal state in the blockchain. This is similar to a computer program including a loop process and may be suitable for describing complicated conditions. Stateless means to not keep the internal state in the blockchain. The process is straightforward. It is suitable to describe the simple conditions.

The term "Data integrity" may be understood as defined by Wikipedia (https://en.wikipe-dia.org/wiki/Data_integrity): "Data integrity is the maintenance of, and the assurance of the accuracy and consistency of, data over its entire life-cycle and is a critical aspect to the design, implementation and usage of any system which stores, processes, or retrieves data."

The term "Certificate authority (CA)" may be understood as defined by Wikipedia (https://en.wikipedia.org/wiki/Certificate_authority): "In cryptography, a certificate authority or certification authority (CA) is an entity that issues digital certificates. A digital certificate certifies the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate. The format of these certificates is specified by the X.509 standard."

The term "Spoofing" may be understood as defined by Wikipedia (https://en.wikipedia.org/wiki/Spoofing_attack#GPS_spoofing): "Spoofing—In the context of information security, and especially network security, a spoofing attack is a situation in which a person or program successfully masquerades as another by falsifying data, to gain an illegitimate advantage.

GPS/GNSS Spoofing

A GPS spoofing attack attempts to deceive a GPS receiver by broadcasting incorrect GPS signals, structured to resemble a set of normal GPS signals, or by rebroadcasting genuine signals captured elsewhere or at a different time. These spoofed signals may be modified in such a way as to cause the receiver to estimate its position to be somewhere other than where it actually is, or to be located where it is but at a different time, as determined by the attacker. One common form of a GPS spoofing attack, commonly termed a carry-off attack, begins by broadcasting signals synchronized with the genuine signals observed by the target receiver. The power of the counterfeit signals is then gradually increased and drawn away from the genuine signals."

The term "Side-channel attack" may be understood as defined by Wikipedia (https://en.wikipedia.org/wiki/Side-channel_attack): "In computer security, a side-channel attack is any attack based on information gained from the implementation of a computer system, rather than weaknesses in the implemented algorithm itself (e.g. cryptanalysis and software bugs). Timing information, power consumption, electromagnetic leaks or even sound can provide an extra source of information, which can be exploited."

The term "Zero-knowledge proof/protocol" may be understood as defined by Wikipedia (https://en.wikipedia.org/wiki/Zero-knowledge_proof): "In cryptography, a zero-knowledge proof or zero-knowledge protocol is a method by which one party (the prover) can prove to another party (the verifier) that they know a value x, without conveying any information apart from the fact that they know the value x. The essence of zero-knowledge proofs is that it is trivial to prove that one possesses knowledge of certain information by simply revealing it; the challenge is to prove such possession without revealing the information itself or any additional information."

In some embodiments, the following terminology related to cellular positioning involved:

UE based positioning: Observed Time Difference of Arrival (OTDOA), Cell ID based Network based positioning: Uplink-Time Difference of Arrival (UTDOA)

Location server in telecom network: Secure User Plane Location (SUPL) server, Enhanced Serving Mobile Location Center (E-SMLC)

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network node for providing data to a distributed ledger, wherein the node comprises circuitry configured to:
provide a special condition for a smart contract, and
verify whether the special condition is met.

(2) The communication network node of (1), wherein the special condition includes a time condition or a location condition.

(3) The communication network node of (1) or (2), wherein the special condition is a condition for a ticket.

(4) The communication network node of (3), wherein the condition is an off-peak condition.

(5) The communication network node of anyone of (1) to (4), wherein the distributed ledger is updated in dependence on the verification whether the special condition is met.

(6) The communication network node of anyone of (1) to (5), wherein the distributed ledger includes a blockchain.

(7) The communication network node of anyone of (1) to (6), wherein the distributed ledger includes data for mobility as a service.

(8) The communication network node of anyone of (1) to (7), wherein access to the distributed ledger is granted based on a permission right.

(9) The communication network node of (8), wherein the node is part of a consortium.

(10) A communication network node for providing data to a distributed ledger, wherein the node comprises circuitry configured to:
recognize a service disturbance, the service being defined on the basis of a smart contract, and
adapt the smart contract on the basis of the recognized service disturbance.

(11) The communication network node of (10), wherein the service is mobility as a service.

(12) The communication network node of (11), wherein the disturbance includes a transport delay or transport disruption.

(13) The communication network node of anyone of (10) to (12), wherein the service disturbance is recognized on the basis of sensor data.

(14) The communication network node of (13), wherein the sensor data are provided by an electronic device worn by a user.

(15) The communication network node of (13), wherein the sensor data are provided by an electronic device mounted at transport station.

(16) The communication network node of anyone of (10) to (15), wherein the disturbance is recognized by checking a transport status provided by a transport operator.

(17) The communication network node of (16), wherein the transport status is checked over an application programming interface of a transport operator server.

(18) The communication network node of anyone of (10) to (17), wherein the smart contract is adapted by stopping, cancelling, suspending, amending or providing a new smart contract.

(19) The communication network node of (18), wherein the smart contract is adapted on the basis of a user preference.

(20) The communication network node of (19), wherein the user preference is stored in a user profile or the user preference is requested from the user.

(21) The communication network node of anyone of (10) to (20), wherein the smart contract is temporarily adapted.

(22) The communication network node of anyone of (10) to (21), wherein the distributed ledger includes a blockchain.

(23) The communication network node of anyone of (10) to (22), wherein the distributed ledger includes data for mobility as a service.

(24) The communication network node of anyone of (10) to (23), wherein access to the distributed ledger is granted based on a permission right.

(25) The communication network node of (24), wherein the node is part of a consortium.

(26) A method for controlling a communication network comprising multiple nodes for providing a distributed ledger, the method comprising:
providing a special condition for a smart contract, and
verifying whether the special condition is met.

(27) The method of (26), wherein the special condition includes a time condition or a location condition.

(28) The method of (26) or (27), wherein the special condition is a condition for a ticket.

(29) The method of (28), wherein the condition is an off-peak condition.

(30) The method of anyone of (26) to (29), wherein the distributed ledger is updated in dependence on the verification whether the special condition is met.

(31) The method of anyone of (26) to (30), wherein the distributed ledger includes a blockchain.

(32) The method of anyone of (26) to (31), wherein the distributed ledger includes data for mobility as a service.

(33) The method of anyone of (26) to (32), wherein access to the distributed ledger is granted based on a permission right.

(34) The method of (33), wherein the node is part of a consortium.

(35) A method for controlling a communication network comprising multiple nodes for providing a distributed ledger, the method comprising:
recognizing a service disturbance, the service being defined on the basis of a smart contract, and
adapting the smart contract on the basis of the recognized service disturbance.

(36) The method of (35), wherein the service is mobility as a service.

(37) The method of (36), wherein the disturbance includes a transport delay or transport disruption.

(38) The method of anyone of (35) to (37), wherein the service disturbance is recognized on the basis of sensor data.

(39) The method of (38), wherein the sensor data are provided by an electronic device worn by a user.

(40) The method of (38), wherein the sensor data are provided by an electronic device mounted at transport station.

(41) The method of anyone of (35) to (40), wherein the disturbance is recognized by checking a transport status provided by a transport operator.

(42) The method of (41), wherein the transport status is checked over an application programming interface of a transport operator server.

(43) The method of anyone of (35) to (42), wherein the smart contract is adapted by stopping, cancelling, suspending, amending or providing a new smart contract.

(44) The method of (43), wherein the smart contract is adapted on the basis of a user preference.

(45) The method of (44), wherein the user preference is stored in a user profile or the user preference is requested from the user.

(46) The method of anyone of (35) to (45), wherein the smart contract is temporarily adapted.

(47) The method of anyone of (35) to (46), wherein the distributed ledger includes a blockchain.

(48) The method of anyone of (35) to (47), wherein the distributed ledger includes data for mobility as a service.

(49) The method of anyone of (35) to (48), wherein access to the distributed ledger is granted based on a permission right.

(50) The method of (49), wherein the node is part of a consortium.

(51) A mobile terminal for communicating with a network node for providing data to a distributed ledger, wherein the mobile terminal comprises circuitry configured to: provide data to the network node for verifying whether a special condition of a smart contract is met.

(52) The mobile terminal of (51), further comprising at least one sensor, wherein the data are provided on the basis of sensor data of the at least one sensor.

(53) The mobile terminal of (52), wherein the at least one sensor provides position data or biometric data.

(54) The mobile terminal of anyone of (51) to (53), wherein the circuitry is further configured to perform an application, the application configured to provide the input data to the network node.

(55) The mobile terminal of (54), wherein the application is a mobility as a service application.

(56) The mobile terminal of anyone of (51) to (55), wherein the mobile terminal is a smartphone.

(57) The mobile terminal of (54), wherein the application is configured to determine a check-in of a user, based on sensor data provided by a sensor of the mobile terminal.

(58) A mobile terminal for communicating with a network node for providing data to a distributed ledger, wherein the mobile terminal comprises circuitry configured to: recognize a service disturbance, the service being defined on the basis of a smart contract.

(59) The mobile terminal of (58), wherein the service is mobility as a service.

(60) The mobile terminal of (58) or (59), wherein the disturbance includes a transport delay or transport disruption.

(61) The mobile terminal of anyone of (58) to (60), wherein the service disturbance is recognized on the basis of sensor data.

(62) The mobile terminal of anyone of (58) to (61), further comprising at least one sensor, wherein the data are provided on the basis of sensor data of the at least one sensor.

(63) The mobile terminal of (62), wherein the at least one sensor provides position data or biometric data.

(64) The mobile terminal of anyone of (58) to (63), wherein the circuitry is further configured to perform an application, the application configured to provide the input data to the network node.

(65) The mobile terminal of (64), wherein the application is a mobility as a service application.

(66) The mobile terminal of anyone of (58) to (65), wherein the mobile terminal is a smartphone.

(67) The mobile terminal of (65) or (66), wherein the application is configured to determine a check-in of a user, based on sensor data provided by a sensor of the mobile terminal.

The invention claimed is:

1. A communication network node for providing data to a distributed ledger, wherein the node comprises circuitry configured to:

provide a smart contract for use in multimodal transportation, the multimodal transportation including a plurality of mobility as a service (MaaS) providers, provide a special condition for the smart contract, wherein the special condition is an off-peak condition for a multimodal transport pass, determine whether the special condition is met based on a determination of whether or not a time condition or a location condition is met, receive position data from at least one sensor, the position data indicating a current position of a passenger, wherein the at least one sensor includes one or more of a Global Navigation Satellite System (GNSS) sensor, a WiFi positioning sensor, a cellular positioning sensor, an inertial measurement unit (IMU) sensor, a Bluetooth beacon sensor, and a Near Field Communication (NFC) sensor, verify validity of the position data by performing a multi-source verification process that combines position data from multiple positioning systems, wherein the circuitry for the multi-source verification process is further configured to receive position data from at least two different types of positioning systems including GNSS positioning, WiFi-based positioning, and cellular-based positioning, compare the position data from the at least two different types of positioning systems to detect positioning spoofing, wherein the at least two different types of positioning systems are randomly selected from the group, and verify a time stamp associated with the position data by comparing a time stamp from an internal clock of a terminal of the passenger with at least one of a network clock and a satellite clock, determine that the special condition is met in response to the verified position data indicating the passenger is in a predetermined off-peak zone at a predetermined off-peak time, in a case that the special condition is met, execute the smart contract and change an internal state of the smart contract, and update the distributed ledger to record the verified position data and the changed internal state of the smart contract.

2. The communication network node of claim 1, wherein the distributed ledger is updated in dependence on the verification whether the special condition is met.

3. The communication network node of claim 1, wherein the distributed ledger includes a blockchain.

4. The communication network node of claim 1, wherein the distributed ledger includes data for mobility as a service.

5. The communication network node of claim 1, wherein access to the distributed ledger is granted based on a permission right.

6. The communication network node of claim 5, wherein the node is part of a consortium.

7. A method for controlling a communication network comprising multiple nodes for providing a distributed ledger, the method comprising:

providing a smart contract for use in multimodal transportation, the multimodal transportation including a plurality of mobility as a service (MaaS) providers, providing a special condition for the smart contract, wherein the special condition is an off-peak condition for a multimodal transport pass;

determining whether the special condition is met based on a determination of whether or not a time condition or a location condition is met;

receiving position data from at least one sensor, the position data indicating a current position of a passenger, wherein the at least one sensor includes one or more of a Global Navigation Satellite System (GNSS) sensor, a WiFi positioning sensor, a cellular positioning sensor, an inertial measurement unit (IMU) sensor, a Bluetooth beacon sensor, and a Near Field Communication (NFC) sensor;

verifying validity of the position data by performing a multi-source verification process that combines position data from multiple positioning systems, wherein verifying the validity of the position data includes receiving position data from at least two different types of positioning systems including GNSS positioning, WiFi-based positioning, and cellular-based positioning;

comparing the position data from the at least two different types of positioning systems to detect positioning spoofing, wherein the at least two different types of positioning systems are randomly selected from the group; and verifying a time stamp associated with the position data by comparing a time stamp from an internal clock of a terminal of the passenger with at least one of a network clock and a satellite clock;

determining that the special condition is met in response to the verified position data indicating the passenger is in a predetermined off-peak zone at a predetermined off-peak time;

in a case that the special condition is met, execute the smart contract and change an internal state of the smart contract; and updating the distributed ledger to record the verified position data and the changed internal state of the smart contract.

* * * * *